United States Patent
Tsai et al.

(10) Patent No.: US 8,411,377 B2
(45) Date of Patent: Apr. 2, 2013

(54) OPTICAL LENS ASSEMBLY FOR IMAGE PHOTOGRAPHING

(75) Inventors: Tsung-Han Tsai, Taichung (TW); Hsin-Hsuan Huang, Taichung (TW)

(73) Assignee: Largan Precision Co., Taichung (TW)

( * ) Notice: Subject to any disclaimer, the term of this patent is extended or adjusted under 35 U.S.C. 154(b) by 73 days.

(21) Appl. No.: 13/237,600

(22) Filed: Sep. 20, 2011

(65) Prior Publication Data

US 2012/0236421 A1     Sep. 20, 2012

(30) Foreign Application Priority Data

Mar. 16, 2011 (TW) ............................... 00108862 A

(51) Int. Cl.
*G02B 9/34* (2006.01)
*G02B 3/02* (2006.01)

(52) U.S. Cl. ...................................... 359/780; 359/715
(58) Field of Classification Search .................. 359/715, 359/771, 772, 780
See application file for complete search history.

(56) References Cited

U.S. PATENT DOCUMENTS

| 7,443,611 | B2 | 10/2008 | Shinohara |
| 7,692,877 | B2 | 4/2010 | Tang et al. |
| 7,785,023 | B1 | 8/2010 | Xu |
| 2007/0058256 | A1 | 3/2007 | Sun |
| 2007/0070234 | A1 | 3/2007 | Sun |
| 2007/0242370 | A1 | 10/2007 | Fukuta et al. |
| 2008/0043346 | A1 | 2/2008 | Sano |
| 2008/0055742 | A1 | 3/2008 | Sato |
| 2009/0207506 | A1 | 8/2009 | Tang et al. |

FOREIGN PATENT DOCUMENTS

| EP | 1821129 A1 | 8/2007 |
| EP | 2090914 A1 | 8/2009 |
| WO | 2010026691 A1 | 3/2010 |

*Primary Examiner* — Jack Dinh
(74) *Attorney, Agent, or Firm* — Wang Law Firm, Inc.; Li K. Wang; Stephen Hsu

(57) ABSTRACT

An optical lens assembly for image photographing, in order from an object side to an image side comprising: a first lens element with positive refractive power having a convex object-side surface; a second lens element with positive refractive power; a third lens element with positive refractive power having a convex image-side surface; a plastic fourth lens element with negative refractive power having a concave image-side surface, both object-side and image-side surfaces being aspheric, and having at least one inflection point. Additionally, the optical lens assembly for photographing image has an image sensor on the image plane for imaging a photographed object and satisfies specific conditions. Thereby, this invention has a high resolving power and can shorten the total length of the lens assembly for using in camera and mobile phone camera with well photographing abilities.

21 Claims, 16 Drawing Sheets

OPTICAL LENS ASSEMBLY FOR IMAGE PHOTOGRAPHING

BACKGROUND OF THE INVENTION

1. Field of the Invention

The present invention relates to an optical lens assembly for image photographing, and more particularly to an optical lens assembly for image photographing consisting of four lens elements with a short total length for applying to electronic products.

2. Description of the Related Art

As advances in technology, current trends in the development of electronic products are primarily toward miniaturization, such as digital still cameras, web cameras or mobile phones. Users require a compact and low-cost optical lens assembly for image photographing, which also has a good aberration correction ability, high resolution, and high imagery quality at the same time.

In general, a conventional optical lens assembly of a compact electronic product comes with different designs, including the two-lens, three-lens, four-lens, and five-or-more lens designs. If the imagery quality is taken into considerations, the four-lens or five-lens optical lens assembly for image photographing is more advantageous in performance of good aberration correction and modulation transfer function (MTF) than others, wherein the four-lens compared to the five-lens has less lens and lower cost, and can be used in high pixel electronic products.

In various compact designs for the four-lens optical lens assemblies for image photographing, different combinations of positive or negative refractive powers are used in prior art as disclosed in U.S. Pat. Publication Nos. US2007/0058256, US2007/0070234, US2007/0242370 or US2008/0043346, etc.

In the compact products, such as digital cameras, web cameras, or mobile phone cameras, the optical lens assembly for image photographing requires a compact design, a short focal length and a good aberration correction. In disclosed prior art as U.S. Pat. or Publication Nos. U.S. Pat. Nos. 7,785,023, 7,692,877, 7,443,611, US2008/055742, US2009/0207506, European Pat. No. EP2090914, EP1821129, and WIPO Pat. No. WO201026691, designs having a combination of a first lens and second lens with positive refractive power and a fourth lens with negative refractive power are provided to meet requirements for good aberration correction and compact design. However, it is still necessary to shorten the total length of lenses in the optical lens assemblies for image photographing disclosed in these patents. Therefore, the present invention provides a feasible design for shortening the total length of the optical lens assembly for image photographing by a combination of refractive powers, concave surfaces and convex surfaces of the four lenses and providing a higher range of positive refractive powers for each lens before the fourth lens element with negative refractive power that will benefit to facilitate the compact design and good aberration correction ability, so as to reduce the total length of the optical system effectively and improve the imagery quality for applying to the electronic products.

SUMMARY OF THE INVENTION

The primary objective of the present invention is to provide an optical lens assembly for image photographing, comprising a first lens element, a second lens element, a third lens element and a fourth lens element sequentially arranged from an object side to an image side along an optical axis, wherein the first lens element with positive refractive power has a convex object-side surface; the second lens element comes with positive refractive power; a third lens element with positive refractive power has a convex image-side surface; the fourth lens element with negative refractive power is made of plastic and has a concave image-side surface, both object-side surface and image-side surface being aspheric, while at least one of the surfaces having at least one inflection point; the optical lens assembly for image photographing satisfies the following condition:

$$0.01 < T_{34}/T_{23} < 0.85; \qquad (1)$$

where, $T_{23}$ is an axial distance between the second lens element and the third lens element, and $T_{34}$ is an axial distance between the third lens element and the fourth lens element.

Another objective of the present invention is to provide an optical lens assembly for image photographing comprising a first lens element, a second lens element, a third lens element and a fourth lens element sequentially arranged from an object side to an image side along an optical axis, wherein the first lens element comes with positive refractive power; the second lens element comes with positive refractive power; the third lens element with positive refractive power has a convex image-side surface; the fourth lens element with negative refractive power is made of plastic and has a concave image-side surface, both object-side surface and image-side surface being aspheric; the optical lens assembly for image photographing satisfies the following conditions:

$$TTL/ImgH < 2.1; \qquad (3)$$

$$|R_8/R_7| < 0.8; \qquad (14)$$

where, TTL is an axial distance from the object-side surface of the first lens element to the image plane, ImgH is a half of the diagonal length of the effective photosensitive area on the image sensor, $R_7$ is a radius of curvature of the object-side surface of the fourth lens element, and $R_8$ is a radius of curvature of the image-side surface of the fourth lens element.

The present invention has capability to shorten the total length of the optical lens assembly for image photographing, and is provided with a good aberration correction and advantageous modulation transfer function (MTF) based on arranging the first lens element, the second lens element, the third lens element and the fourth lens element with appropriate intervals along the optical axis.

In the optical lens assembly for image photographing of the present invention, the first lens element, the second lens element and the third lens element with positive refractive power provide a more powerful refractive power to the lens assembly, and shorten the total length of the optical lens assembly for image photographing. The fourth lens element with negative refractive power has the capability to effectively compensate the aberration formed from the first lens element, the second lens element and the third lens element with positive refractive powers, and correct the Petzval sum of the system, thereby flattening the periphery image surface and facilitating correcting the aberration of the system for enhancing the resolution of the optical lens assembly for image photographing to meet the high-resolution requirement of the overall aberration and distortion of the optical lens assembly for image photographing.

DETAILED DESCRIPTION OF THE PREFERRED EMBODIMENTS

The assembly and overall operation method of the present invention to achieve the foregoing objectives and effects will become apparent with the detailed description of preferred embodiments together with related drawings as follows.

Figure 1A:
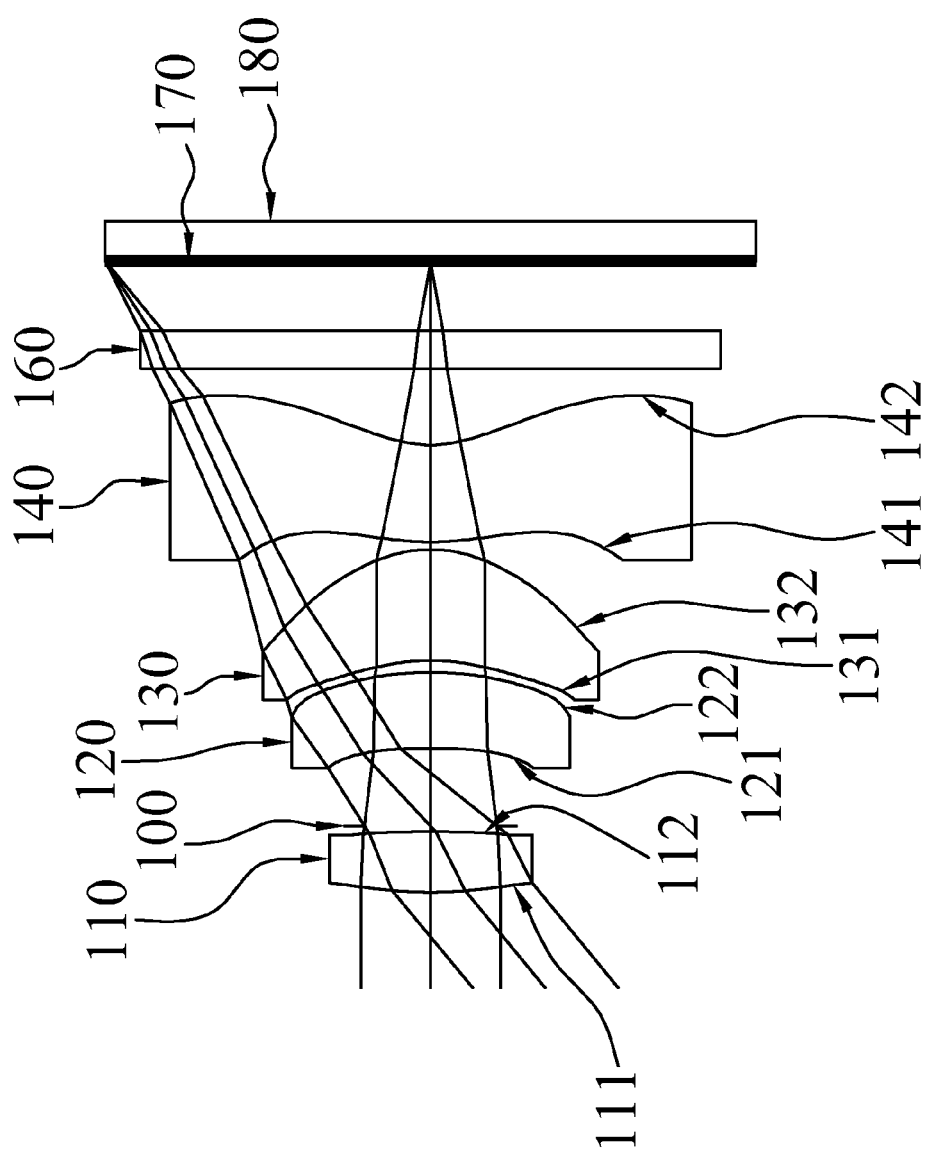
FIG. 1A is a schematic view of an optical lens assembly for image photographing in accordance with the first preferred embodiment of the present invention.

With reference to FIG. 1A for an optical lens assembly for image photographing of the present invention, the optical lens assembly for image photographing, in order from an object side to an image side along an optical axis, comprising: a first lens element (110), a second lens element (120), a third lens element (130), a fourth lens element (140), an IR-filter (160) and an image sensor (180), wherein the first lens element (110) has a convex object-side surface (111); the second lens element (120) has a convex object-side surface (121), both object-side surface (121) and image-side surface (122) being aspheric; the third lens element (130) has a convex image-side surface (132); the fourth lens element (140) is made of plastic, and has a concave image-side surface (142), both object-side surface (141) and image-side surface (142) being aspheric and having at least one inflection point; the image sensor (180) is installed at the image plane (170) for imaging an photographed object, and can be a charge coupled device (CCD) optical sensor or a complementary metal oxide semiconductor (CMOS) optical sensor, but the image sensor of the invention is not limited to such forms or arrangements only. Additionally, the optical lens assembly for image photographing of the present invention comprises a stop, which can be an aperture stop (100). The aperture stop (100) is a middle stop disposed between the first lens element (110) and the second lens element (120). For different applications, the aperture stop (100) can be a front stop disposed between a photographed object and the first lens element (110). The aspherical surface formula of the first lens element (110), the second lens element (120), the third lens element (130) and the fourth lens element (140) satisfies the condition (15) below:

$$X(Y) = \frac{(Y^2/R)}{1 + \sqrt{(1-(1+K)(Y/R)^2)}} + \sum_i (A_i) \cdot (Y^i); \quad (15)$$

where, X is the relative height from a point on the aspherical surface being a distance Y away the optical axis to a tangent plane contacting to the apex of optical axis on the aspherical surface;

Y is the distance between a point on the curve of the aspherical surface and the optical axis;

K is the conic coefficient; and $A_i$ is the $i^{th}$ level aspherical surface coefficient.

In the optical lens assembly for image photographing of the present invention, the first lens element (110), the second lens element (120), the third lens element (130) and the fourth lens element (140) are installed, such that if the ratio of $T_{34}$, the axial distance between the image-side surface (132) of the third lens element (130) and the object-side surface (141) of the fourth lens element (140), to $T_{23}$, the axial distance between the image-side surface (122) of the second lens element (120) and the object-side surface (131) of the third lens element (130), is limited to the condition (1), the total length of the optical lens assembly for image photographing can be shortened.

For different applications, the optical lens assembly for image photographing satisfied one or more combinations of the following conditions besides condition (1) or conditions (3) and (14):

$0.75 < SL/TTL < 1.1;$ (2)

$TTL/ImgH < 2.1;$ (3)

$(pow_1 + pow_2)/(pow_3 - pow_4) < 0.7;$ (4)

or preferably, $(pow_1 + pow_2)/(pow_3 - pow_4) < 0.4;$ (11)

$0.0 < f/f_1 < 1.2;$ (5)

or preferably, $0.0 < f/f_1 < 0.55;$ (13)

$25 < v_3 - v_4 < 40;$ (6)

$|R_8/R_7| < 0.6;$ (7)

$HFOV > 36°;$ (8)

$0.3 < CT_1/CT_4 < 1.5;$ (9)

$0 < f/f_2 < 0.4;$ (10)

$0 < f/f_2 < 0.8;$ (12)

where, SL is an axial distance from the stop to the image plane, TTL is an axial distance from the object-side surface of the first lens element to the image plane, ImgH is a half of the diagonal length of the effective photosensitive area of the image sensor, $R_2$ is a radius of curvature of the object-side surface of the first lens element, $R_8$ is a radius of curvature of the image-side surface of the fourth lens element, f is a focal length of the optical lens assembly for image photographing, $f_1$ is a focal length of the first lens element, $f_2$ is the focal length of the second lens element, $v_3$ is an Abbe number of the third lens element, $v_4$ is an Abbe number of the fourth lens element, $pow_1$ is a ratio of the focal length f of the optical lens assembly for image photographing to the focal length $f_1$ of the first lens element, $pow_2$ is a ratio of the focal length f of the optical lens assembly for image photographing to the focal length $f_2$ of the second lens element, $pow_3$ is a ratio of the focal length f of the optical lens assembly for image photographing to the focal length $f_3$ of the third lens element, $pow_4$ is a ratio of the focal length f of the optical lens assembly for image photographing to the focal length $f_4$ of the fourth lens element, $CT_1$ is a central thickness of the first lens element, and $CT_4$ is a central thickness of the fourth lens element.

The optical lens assembly for image photographing of the present invention further satisfies one or combinations of the conditions (2), (3), (4), (5), (6), (7), (8), (9), (10), (11) and (13) besides (1). If the ratio of SL the axial distance from an aperture stop (100) to the image plane (170) of the image sensor (180) to TTL the axial distance from the object-side surface (111) of the first lens element (110) to the image plane (170) of the image sensor (180) is limited to the condition (2), the optical lens assembly for image photographing can achieve a better balance between the telecentric property and a wider field angle, and shorten the total length of the optical lens assembly for image photographing effectively to facilitate a thinner design. In addition, if the condition (3) is satisfied, the total length of the optical lens assembly for image photographing (TTL) can be shortened effectively, such that a larger effective pixel range (ImgH) of the image sensor can be achieved within the same total length (TTL).

If the refractive power $pow_1$ of the first lens element (110), the refractive power $pow_2$ of the second lens element (120), the refractive power $pow_3$ of the third lens element (130), the refractive power $pow_4$ of the fourth lens element (140) satisfy the conditions (4), (5), (10) and (11), the refractive powers of the first lens element (110), the second lens element (120), the third lens element (130) and the fourth lens element (140) can be adjusted to facilitate correcting the aberration and shortening the total length.

Moreover, in the optical lens assembly for image photographing of the present invention, the main negative refractive power is provided by the fourth lens element (140). If the ratio of $R_7$ the radius of curvature of the object-side surface (141) of the fourth lens element (140) to $R_8$ the radius of curvature of the image-side surface (142) of the fourth lens element (140) is restricted, $R_8$ the radius of the image-side surface (142) of the fourth lens element (140) tends to become a smaller design to enhance the refractive power of the fourth lens element (140) and provide the aberration compensation ability effectively.

If the difference between the Abbe numbers of the third lens element (130) and the fourth lens element (140) is limited to the condition (6), the color difference of the optical lens assembly for image photographing can be corrected easier. If the HFOV a half of maximum view angle satisfies the condition (8), the field angle of the optical lens assembly for image photographing can be increased. If the ratio of the central thickness $CT_1$ of the first lens element (110) to the central thickness $CT_4$ of the fourth lens element (140) is limited to the condition (9), the total length of the optical lens assembly for image photographing can be shorted as well.

The optical lens assembly for image photographing of the present invention comprises a first lens element (110), a second lens element (120), a third lens element (130), a fourth lens element (140), an IR-filter (160) and an image sensor (180) sequentially arranged from an object side to an image side along an optical axis, wherein the first lens element (110) has an object-side surface (111) and an image-side surface (112) being aspheric or spheric; the second lens element (120) has an object-side surface (121) and an image-side surface (122) being aspheric or spheric; the third lens element (130) has a convex image-side surface (132); the fourth lens element (140) is made of plastic and has a concave image-side surface (142), both object-side surface (141) and image-side surface (142) being aspheric; the image sensor (180) is installed on the image plane (170) for imaging an photographed object. With the aforementioned installation, the optical lens assembly for image photographing satisfies conditions (3) and (14).

In the optical lens assembly for image photographing of the present invention, at least one of the object-side surface (141) and image-side surface (142) of the fourth lens element (140) has at least one inflection point, and further satisfies one or combinations of the conditions (12), (6), (7), (4), (2) and (13) besides (3) and (14).

The optical lens assembly for image photographing of the present invention is described by means of preferred embodiments with relevant drawings as follows.

<First Preferred Embodiment>

Figure 1B:
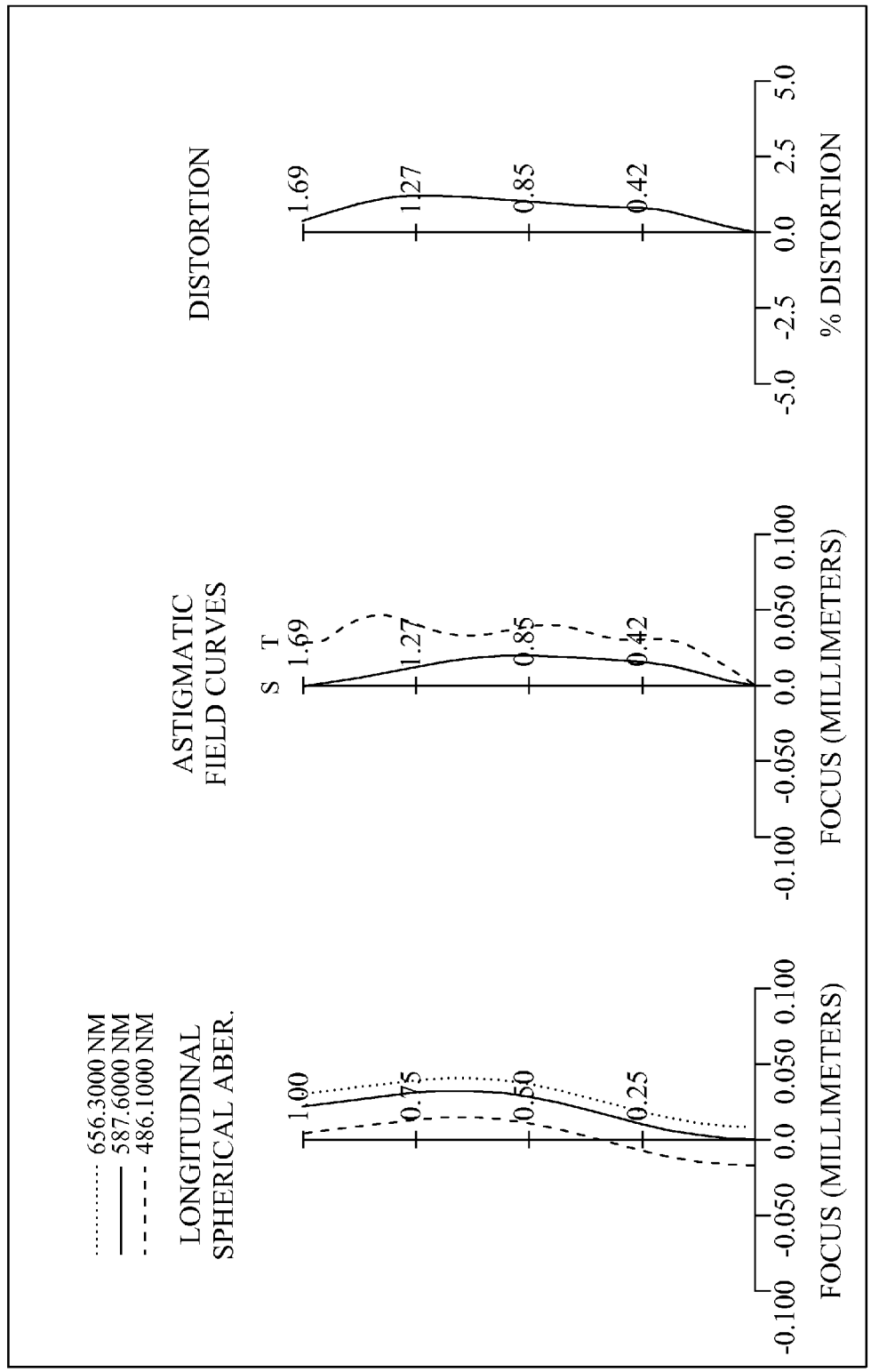
FIG. 1B is a series of aberration curves of the first preferred embodiment of the present invention.

FIG. 1A is for a schematic view of an optical lens assembly for image photographing in accordance with the first preferred embodiment of the present invention, and FIG. 1B is for a series of aberration curves of the first preferred embodiment of the present invention. The optical lens assembly for image photographing of the first preferred embodiment primarily comprises an aperture stop (100), four lens elements, an IR-filter (160) and an image sensor (180) to constitute the optical lens assembly for image photographing with a larger view angle. The optical system, sequentially arranged from an object side to an image side along an optical axis comprises: a plastic first lens element (110) with positive refractive power having a convex object-side surface (111) and a convex image-side surface (112), and both object-side surface (111) and image-side surface (112) being aspheric; a second lens element (120) with positive refractive power, made of plastic, having a concave object-side surface (121) and a convex image-side surface (122), and both object-side surface (121) and image-side surface (122) being aspheric; a third lens element (130) with positive refractive power, made of plastic, having a concave object-side surface (131) and a convex image-side surface (132), and both object-side surface (131) and image-side surface (132) being aspheric; a fourth lens element with negative refractive power (140), made of plastic, having a convex object-side surface (141) and a concave image-side surface (142), both object-side surface (141) and image-side surface (142) being aspheric, and each surface thereof having at least one inflection point; the IR-filter (160) made of glass being a flat glass and without influences on the focal length of the optical lens assembly for image photographing of the present invention; and the image sensor (180) installed on the image plane (170). In this preferred embodiment, the aperture stop (100) is a middle aperture stop formed between the first lens element (110) and the second lens element (120).

The optical data of the optical lens assembly for image photographing of this preferred embodiment are listed in Table 1-1 as follows:

TABLE 1-1 f = 2.03 mm, Fno = 2.80, HFOV = 39.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.204820 (ASP) | 0.316 | Plastic | 1.544 | 55.9 | 3.19 |
| 2 | | −7.701200 (ASP) | 0.030 | | | | |
| 3 | Ape. Stop | Plano | 0.406 | | | | |
| 4 | Lens 2 | −3.099100 (ASP) | 0.395 | Plastic | 1.544 | 55.9 | 6.29 |
| 5 | | −1.699680 (ASP) | 0.062 | | | | |
| 6 | Lens 3 | −0.998110 (ASP) | 0.579 | Plastic | 1.544 | 55.9 | 2.16 |
| 7 | | −0.650710 (ASP) | 0.040 | | | | |
| 8 | Lens 4 | 1.519310 (ASP) | 0.505 | Plastic | 1.634 | 23.8 | −2.12 |
| 9 | | 0.621240 (ASP) | 0.400 | | | | |
| 10 | IR-filter | Plano | 0.200 | Glass | 1.517 | 64.2 | — |
| 11 | | Plano | 0.360 | | | | |
| 12 | Image | Plano | — | | | | |

Note:
Reference wavelength is 587.6 nm.
ASP stands for aspherical surfaces

Wherein, the object-side surface and the image-side surface of the first lens element (110) to the fourth lens element (140) comply with the aspheric surface formula as given in condition (15), and the aspheric coefficients are listed in Table 1-2 as follows:

TABLE 1-2

Aspheric Coefficients

| Surface # | 1 | 2 | 4 | 5 |
|---|---|---|---|---|
| k = | −4.17195E+01 | 4.95425E+00 | −1.00000E+00 | 4.00157E+00 |
| A4 = | 3.30286E−01 | −1.38321E−01 | −6.55216E−01 | 1.84010E−01 |
| A6 = | −1.53066E+00 | −8.76915E−01 | 1.00267E+00 | −9.96274E−01 |
| A8 = | 3.32500E+00 | 1.30514E−01 | −1.53705E+00 | 3.15867E+00 |
| A10 = | −1.15603E+01 | 2.69221E+01 | −3.62084E+01 | 2.66215E+00 |
| A12 = | 3.45202E+01 | −9.50759E+01 | 1.96119E+02 | −1.67218E+01 |
| A14 = | −4.94033E+01 | −5.08215E+01 | −3.61807E+02 | 9.47590E+00 |

| Surface # | 6 | 7 | 8 | 9 |
|---|---|---|---|---|
| k = | −1.30027E+01 | −4.12575E+00 | −2.20450E−01 | −4.00694E+00 |
| A4 = | −5.45182E−01 | −8.19960E−01 | −6.13430E−01 | −2.79288E−01 |
| A6 = | 3.63034E+00 | 1.97197E+00 | 2.02104E−01 | 2.26332E−01 |
| A8 = | −1.74375E+01 | −4.06373E+00 | −8.11099E−02 | −1.38354E−01 |
| A10 = | 5.11838E+01 | 3.98247E+00 | −2.86991E−02 | 5.05528E−02 |
| A12 = | −7.57263E+01 | −1.27573E+00 | 1.31998E−01 | −9.50226E−03 |
| A14 = | 4.10274E+01 | −2.04057E−02 | −6.89114E−02 | 5.73526E−04 |

According to the optical data as shown in Table 1-1 and the aberration curve as shown in FIG. 1B, the optical lens assembly for image photographing in accordance with this preferred embodiment of the present invention provides good correction results in aspects of the longitudinal spherical aberration, astigmatic field curving, and distortion.

In the optical lens assembly for image photographing of this preferred embodiment, the relation of each variable (f, Fno, HFOV, $f_1$, $f_2$, $v_3$, $v_4$, $R_2$, $R_8$, $T_{23}$, $T_{34}$, $CT_1$, $CT_4$, $pow_1$, $pow_2$, $pow_3$, $pow_4$, SL, TTL and ImgH) is defined as mentioned before, thus will not be described here again. Data of related relations are listed in Table 1-3 as follows:

TABLE 1-3

| Relation | Data | Relation | Data |
|---|---|---|---|
| f(mm) | 2.03 | $R_8/R_7$ | 0.41 |
| Fno | 2.80 | $f/f_1$ | 0.64 |
| HFOV | 39.5 | $f/f_2$ | 0.32 |
| $v_3 - v_4$ | 32.1 | $(pow_1 + pow_2)/(pow_3 - pow_4)$ | 0.51 |
| $CT_1/CT_4$ | 0.63 | SL/TTL | 0.89 |
| $T_{34}/T_{23}$ | 0.65 | TTL/ImgH | 1.90 |

<Second Preferred Embodiment>

Figure 2A:
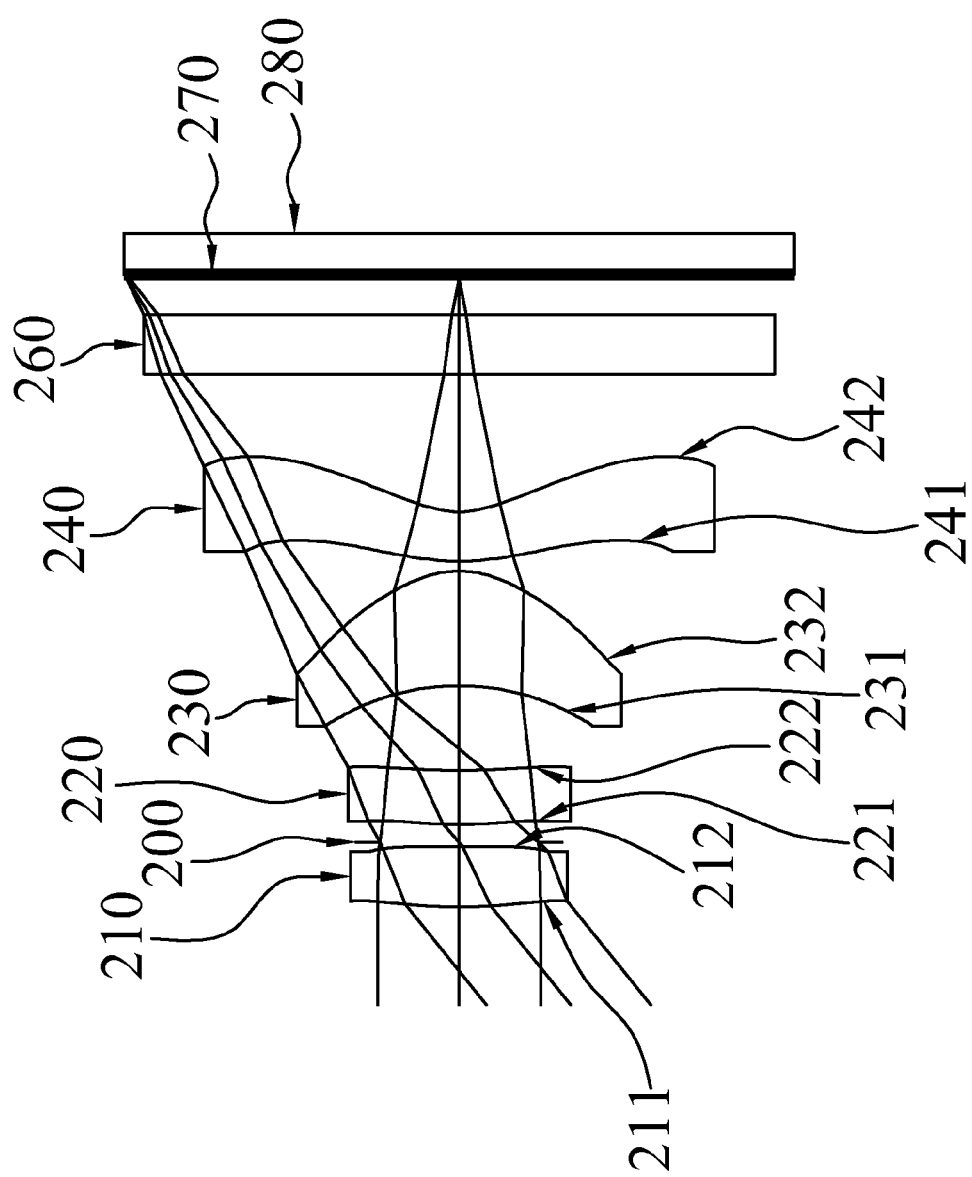
FIG. 2A is a schematic view of an optical lens assembly for image photographing in accordance with the second preferred embodiment of the present invention.
Figure 2B:
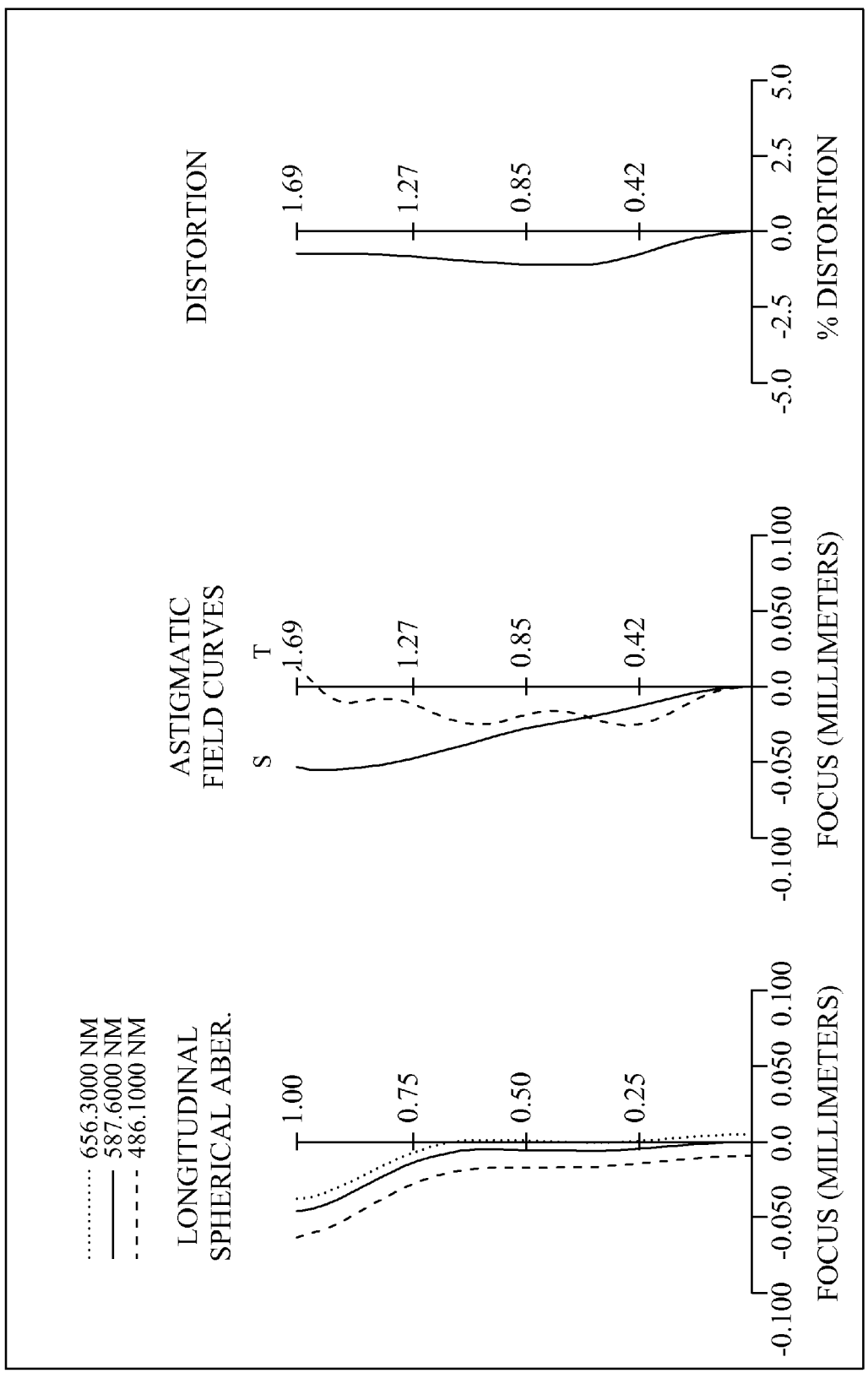
FIG. 2B is a series of aberration curves of the second preferred embodiment of the present invention.

FIG. 2A is for a schematic view of an optical lens assembly for image photographing in accordance with the second preferred embodiment of the present invention, and FIG. 2B is for a series of aberration curves of the second preferred embodiment of the present invention. The optical lens assembly for image photographing of the second preferred embodiment comprises an aperture stop (200), four lens elements, an IR-filter (260) and an image sensor (280) to constitute the optical lens assembly for image photographing with a larger view angle. The optical system, sequentially from an object side to an image side along an optical axis comprises: a plastic first lens element (210) with positive refractive power having a convex object-side surface (211) and a concave image-side surface (212), and both object-side surface (211) and image-side surface (212) being aspheric; a second lens element (220) with positive refractive power, made of plastic, having a convex object-side surface (221) and a concave image-side surface (222), and both object-side surface (221) and image-side surface (222) being aspheric; a third lens element (230) with positive refractive power, made of plastic, having a concave object-side surface (231) and a convex image-side surface (232), and both object-side surface (231) and image-side surface (232) being aspheric; a fourth lens element with negative refractive power (240), made of plastic, having a convex object-side surface (241) and a concave image-side surface (242), both object-side surface (241) and image-side surface (242) being aspheric, and each surface thereof having at least one inflection point; the IR-filter (260) made of glass being a flat glass and without influences on the focal length of the optical lens assembly for image photographing of the present invention; and an image sensor (280) installed on the image plane (270). In this preferred embodiment, the aperture stop (200) is a middle aperture stop formed between the first lens element (210) and the second lens element (220).

The optical data of the optical lens assembly for image photographing of this preferred embodiment are listed in Table 2-1 as follows:

In the optical lens assembly for image photographing of this preferred embodiment, the relation of each variable (f, Fno, HFOV, $f_1$, $f_2$, $v_3$, $v_4$, $R_2$, $R_8$, $T_{23}$, $T_{34}$, $CT_1$, $CT_4$, $pow_1$, $pow_2$, $pow_3$, $pow_4$, SL, TTL and ImgH) is defined as mentioned before, thus will not be described here again. Data of related relations are listed in Table 2-3 as follows:

TABLE 2-3

| Relation | Data | Relation | Data |
| --- | --- | --- | --- |
| f(mm) | 2.15 | $R_8/R_7$ | 0.35 |
| Fno | 2.60 | $f/f_1$ | 0.41 |
| HFOV | 38.6 | $f/f_2$ | 0.24 |
| $v_3 - v_4$ | 32.1 | $(pow_1 + pow_2)/(pow_3 - pow_4)$ | 0.17 |
| $CT_1/CT_4$ | 1.23 | SL/TTL | 0.90 |
| $T_{34}/T_{23}$ | 0.12 | TTL/ImgH | 1.83 |

TABLE 2-1 f = 2.15 mm, Fno = 2.60, HFOV = 38.6 deg.

| Surface # | | Curvature Radius | Thickness | Material | Index | Abbe # | Focal length |
| --- | --- | --- | --- | --- | --- | --- | --- |
| 0 | Object | Plano | Infinity | | | | |
| 1 | Lens 1 | 2.442140 (ASP) | 0.307 | Plastic | 1.530 | 55.8 | 5.31 |
| 2 | | 17.636200 (ASP) | 0.020 | | | | |
| 3 | Ape. Stop | Plano | 0.092 | | | | |
| 4 | Lens 2 | 2.280790 (ASP) | 0.275 | Plastic | 1.544 | 55.9 | 8.94 |
| 5 | | 4.112400 (ASP) | 0.428 | | | | |
| 6 | Lens 3 | −1.189560 (ASP) | 0.582 | Plastic | 1.544 | 55.9 | 1.06 |
| 7 | | −0.454390 (ASP) | 0.050 | | | | |
| 8 | Lens 4 | 1.285800 (ASP) | 0.250 | Plastic | 1.634 | 23.8 | −1.22 |
| 9 | | 0.445630 (ASP) | 0.700 | | | | |
| 10 | IR-filter | Plano | 0.300 | Glass | 1.517 | 64.2 | — |
| 11 | | Plano | 0.206 | | | | |
| 12 | Image | Plano | — | | | | |

Note:
Reference wavelength is 587.6 nm.
ASP stands for aspherical surfaces

Wherein, the object-side surface and the image-side surface of the first lens element (210) to the fourth lens element (240) comply with the aspheric surface formula as given in condition (15), and the aspheric coefficients are listed in Table 2-2 as follows:

TABLE 2-2

| | Aspheric Coefficients | | | |
| --- | --- | --- | --- | --- |
| Surface # | 1 | 2 | 4 | 5 |
| k = | −9.87207E+00 | 0.00000E+00 | −1.00000E+00 | 2.84036E+00 |
| A4 = | −1.05801E−01 | −7.13653E−01 | −4.84988E−01 | −9.59330E−03 |
| A6 = | −7.80079E−01 | 1.00465E+00 | −1.38140E+00 | −9.70648E−01 |
| A8 = | 3.75463E+00 | −1.55168E+01 | 3.20408E+00 | 8.58235E−01 |
| A10 = | −1.79611E+01 | 6.97215E+01 | −1.93736E+01 | 1.97321E+00 |
| A12 = | 2.98714E+01 | −9.48085E+01 | 1.41313E+02 | −1.44593E+01 |
| A14 = | −2.25255E+01 | −5.08204E+01 | −3.61806E+02 | 1.82618E+01 |
| Surface # | 6 | 7 | 8 | 9 |
| k = | −9.92810E+00 | −3.75870E+00 | −2.16417E−01 | −4.98165E+00 |
| A4 = | −7.13659E−01 | −8.44327E−01 | −5.68142E−01 | −1.88842E−01 |
| A6 = | 3.28742E+00 | 1.88249E+00 | 4.04659E−01 | 1.29427E−01 |
| A8 = | −1.75298E+01 | −3.95821E+00 | −2.59138E−01 | −1.03299E−01 |
| A10 = | 5.16226E+01 | 4.10432E+00 | −3.76484E−02 | 5.31076E−02 |
| A12 = | −7.44402E+01 | −1.21748E+00 | 1.75635E−01 | −1.36275E−02 |
| A14 = | 4.22143E+01 | 1.81894E−02 | −8.24129E−02 | 5.31458E−04 |

According to the optical data as shown in Table 2-1 and the aberration curve as shown in FIG. 2B, the optical lens assembly for image photographing in accordance with this preferred embodiment of the present invention provides good correction results in aspects of the longitudinal spherical aberration, astigmatic field curving, and distortion.

<Third Preferred Embodiment>

Figure 3A:
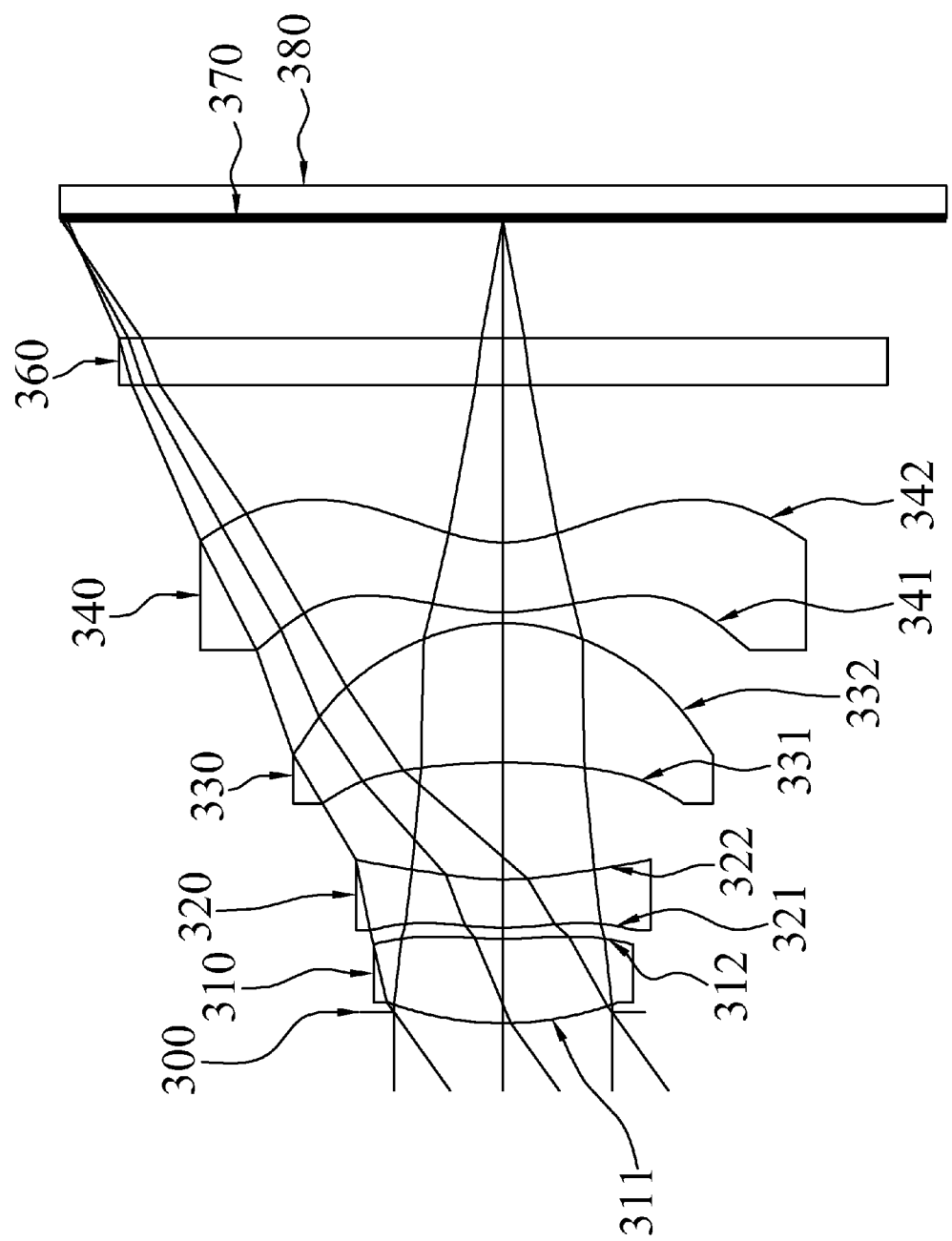
FIG. 3A is a schematic view of an optical lens assembly for image photographing in accordance with the third preferred embodiment of the present invention.
Figure 3B:
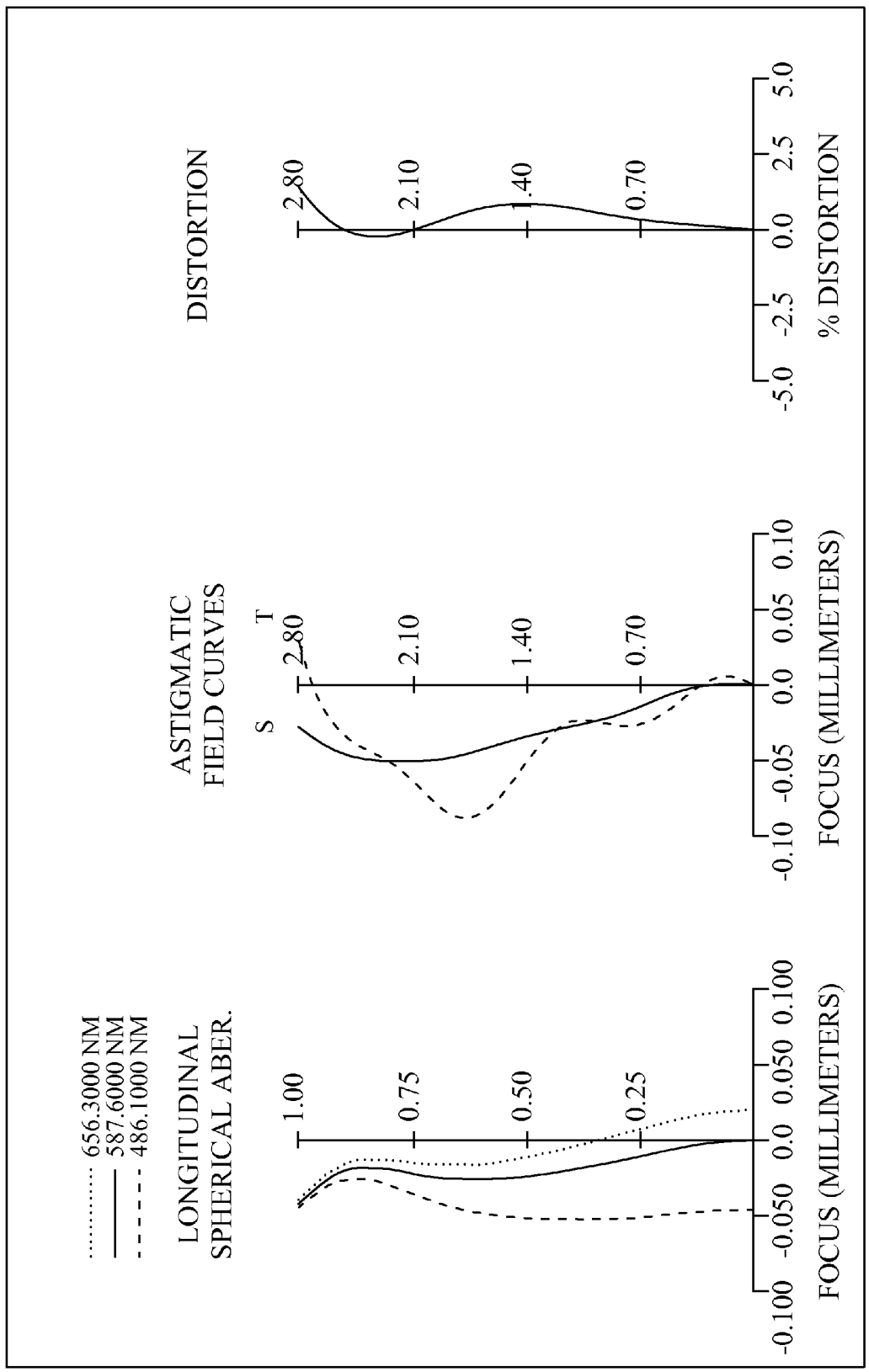
FIG. 3B is a series of aberration curves of the third preferred embodiment of the present invention.

FIG. 3A is for a schematic view of an optical lens assembly for image photographing in accordance with the third preferred embodiment of the present invention, and FIG. 3B is for a series of aberration curves of the third preferred embodiment of the present invention. The optical lens assembly for image photographing mainly comprises an aperture stop (300), four lens elements, an IR-filter (360) and an image sensor (380) to constitute the optical lens assembly for image photographing with a larger view angle. The optical system, sequentially from an object side to an image side along an optical axis comprises: a plastic first lens element (310) with positive refractive power having a convex object-side surface (311) and a concave image-side surface (312), and both object-side surface (311) and image-side surface (312) being aspheric; a second lens element (320) with positive refractive power, made of plastic, having a convex object-side surface (321) and a concave image-side surface (322), and both object-side surface (321) and image-side surface (322) being aspheric; a third lens element (330) with positive refractive power, made of plastic, having a concave object-side surface (331) and a convex image-side surface (332), and both object-side surface (331) and image-side surface (332) being aspheric; a fourth lens element with negative refractive power (340), made of plastic, having a convex object-side surface (341) and a concave image-side surface (342), both object-side surface (341) and image-side surface (342) being aspheric, and each surface thereof having at least one inflection point; the IR-filter (360) made of glass being a flat glass and without influences on the focal length of the optical lens assembly for image photographing of the present invention; and the image sensor (380) installed on the image plane (370). In this preferred embodiment, the aperture stop (300) is a front aperture stop formed between the first lens element (310) and a photographed object.

The optical data of the optical lens assembly for image photographing of this preferred embodiment are listed in Table 3-1 as follows:

TABLE 3-1 f = 3.88 mm, Fno = 2.80, HFOV = 35.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.069 | | | | |
| 2 | Lens 1 | 2.077270 (ASP) | 0.536 | Plastic | 1.530 | 55.8 | 9.95 |
| 3 | | 3.121500 (ASP) | 0.070 | | | | |
| 4 | Lens 2 | 1.839850 (ASP) | 0.306 | Plastic | 1.583 | 30.2 | 23.87 |
| 5 | | 1.990050 (ASP) | 0.744 | | | | |
| 6 | Lens 3 | −3.364300 (ASP) | 0.884 | Plastic | 1.530 | 55.8 | 3.15 |
| 7 | | −1.216280 (ASP) | 0.070 | | | | |
| 8 | Lens 4 | 1.502720 (ASP) | 0.442 | Plastic | 1.632 | 23.4 | −4.71 |
| 9 | | 0.884960 (ASP) | 1.000 | | | | |
| 10 | IR-filter | Plano | 0.300 | Glass | 1.517 | 64.2 | — |
| 11 | | Plano | 0.761 | | | | |
| 12 | Image | Plano | — | | | | |

Note:
Reference wavelength is 587.6 nm.
ASP stands for aspherical surfaces

Wherein, the object-side surface and the image-side surface of the first lens element (310) to the fourth lens element (340) comply with the aspheric surface formula as given in condition (15), and the aspheric coefficients are listed in Table 3-2 as follows:

TABLE 3-2

| Aspheric Coefficients | | | | |
|---|---|---|---|---|
| Surface # | 2 | 3 | 4 | 5 |
| k = | −7.63901E−01 | −1.00000E+00 | −1.00000E+00 | −1.00000E+00 |
| A4 = | −7.86249E−03 | −5.75200E−01 | −6.67041E−01 | −2.01777E−01 |
| A6 = | 5.17383E−02 | 5.53760E−01 | 1.45000E−01 | −9.67320E−02 |
| A8 = | 3.96034E−02 | −1.62143E−01 | 6.02319E−01 | 4.23752E−01 |
| A10 = | −5.63269E−01 | −3.81951E−01 | −2.37638E−01 | −2.12923E−01 |
| A12 = | 7.02222E−01 | 3.36404E−01 | −5.43744E−01 | 4.80684E−02 |
| A14 = | 3.32559E−01 | 2.83737E−02 | −1.51140E−02 | −2.80765E−01 |
| A16 = | −7.53066E−01 | 1.59856E−02 | 5.55549E−01 | 2.22999E−01 |
| Surface # | 6 | 7 | 8 | 9 |
| k = | −9.45002E+01 | −7.45129E−01 | −9.81161E+00 | −4.16425E+00 |
| A4 = | −1.34280E−01 | 5.08555E−02 | −9.76516E−02 | −1.18992E−01 |
| A6 = | 2.30272E−02 | 3.52858E−02 | −2.47240E−02 | 3.17387E−02 |
| A8 = | −3.70974E−01 | −1.42033E−01 | 6.79471E−03 | −7.69309E−03 |
| A10 = | 2.29468E−01 | 9.33514E−02 | 1.02316E−03 | 1.09203E−03 |
| A12 = | −5.25180E−02 | −2.20398E−03 | −2.41116E−04 | 1.60595E−05 |
| A14 = | −5.29847E−03 | −2.64568E−02 | 9.92566E−05 | −3.48461E−05 |
| A16 = | 5.52092E−03 | 9.17299E−03 | −9.87739E−06 | 4.83239E−06 |

In the optical lens assembly for image photographing of this preferred embodiment, the relation of each variable (f, Fno, HFOV, $f_1$, $f_2$, $v_3$, $v_4$, $R_2$, $R_8$, $T_{23}$, $T_{34}$, $CT_1$, $CT_4$, $pow_1$, $pow_2$, $pow_3$, $pow_4$, SL, TTL and ImgH) is defined as mentioned before, thus will not be described here again. Data of related relations are listed in Table 3-3 as follows:

TABLE 3-3

| Relation | Data | Relation | Data |
|---|---|---|---|
| f(mm) | 3.88 | $R_8/R_7$ | 0.59 |
| Fno | 2.80 | $f/f_1$ | 0.39 |
| HFOV | 35.6 | $f/f_2$ | 0.16 |
| $v_3 - v_4$ | 32.4 | $(pow_1 + pow_2)/(pow_3 - pow_4)$ | 0.27 |
| $CT_1/CT_4$ | 1.21 | SL/TTL | 0.99 |
| $T_{34}/T_{23}$ | 0.09 | TTL/ImgH | 1.79 |

According to the optical data as shown in Table 3-1 and the aberration curve as shown in FIG. 3B, the optical lens assembly for image photographing in accordance with this preferred embodiment of the present invention provides good correction results in aspects of the longitudinal spherical aberration, astigmatic field curving, and distortion.

<Fourth Preferred Embodiment>

Figure 4A:
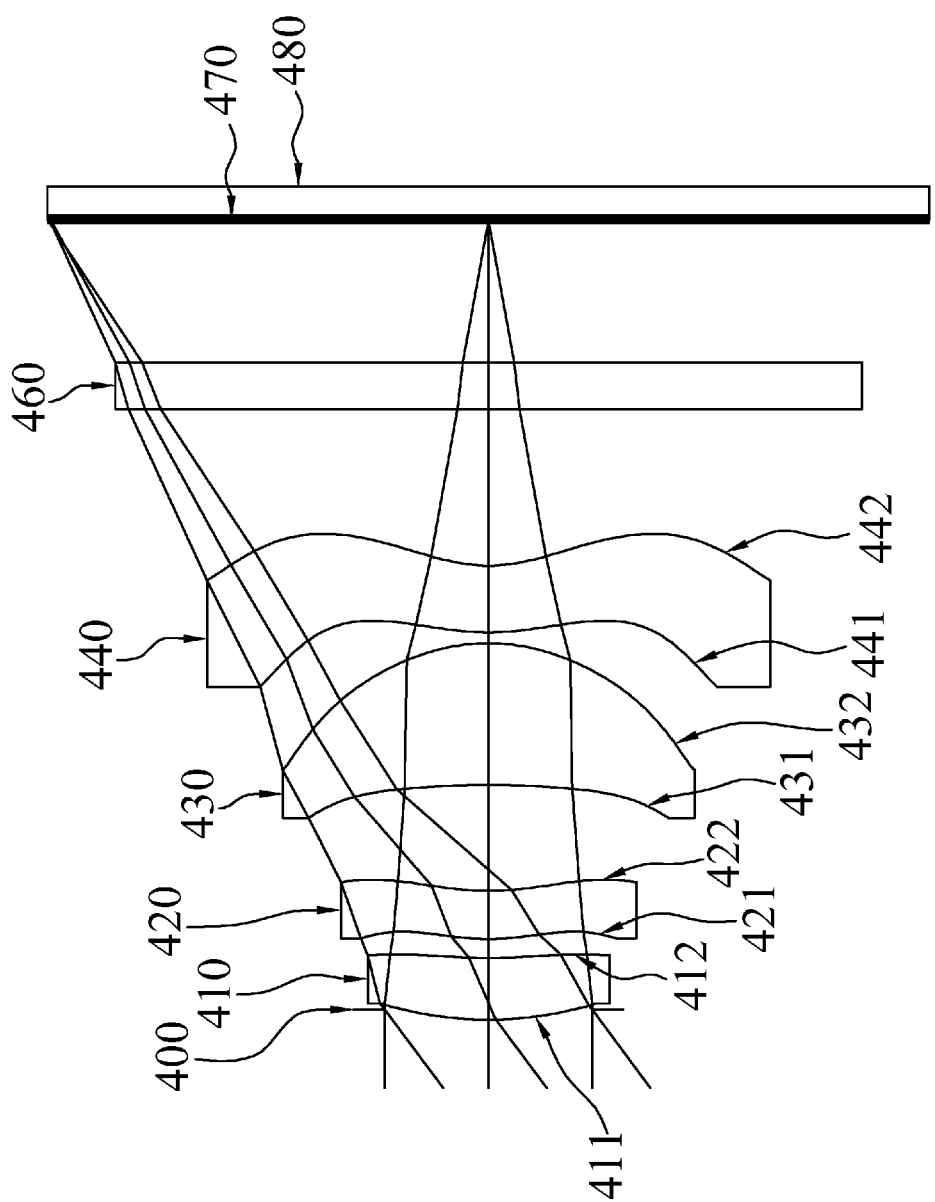
FIG. 4A is a schematic view of an optical lens assembly for image photographing in accordance with the fourth preferred embodiment of the present invention.
Figure 4B:
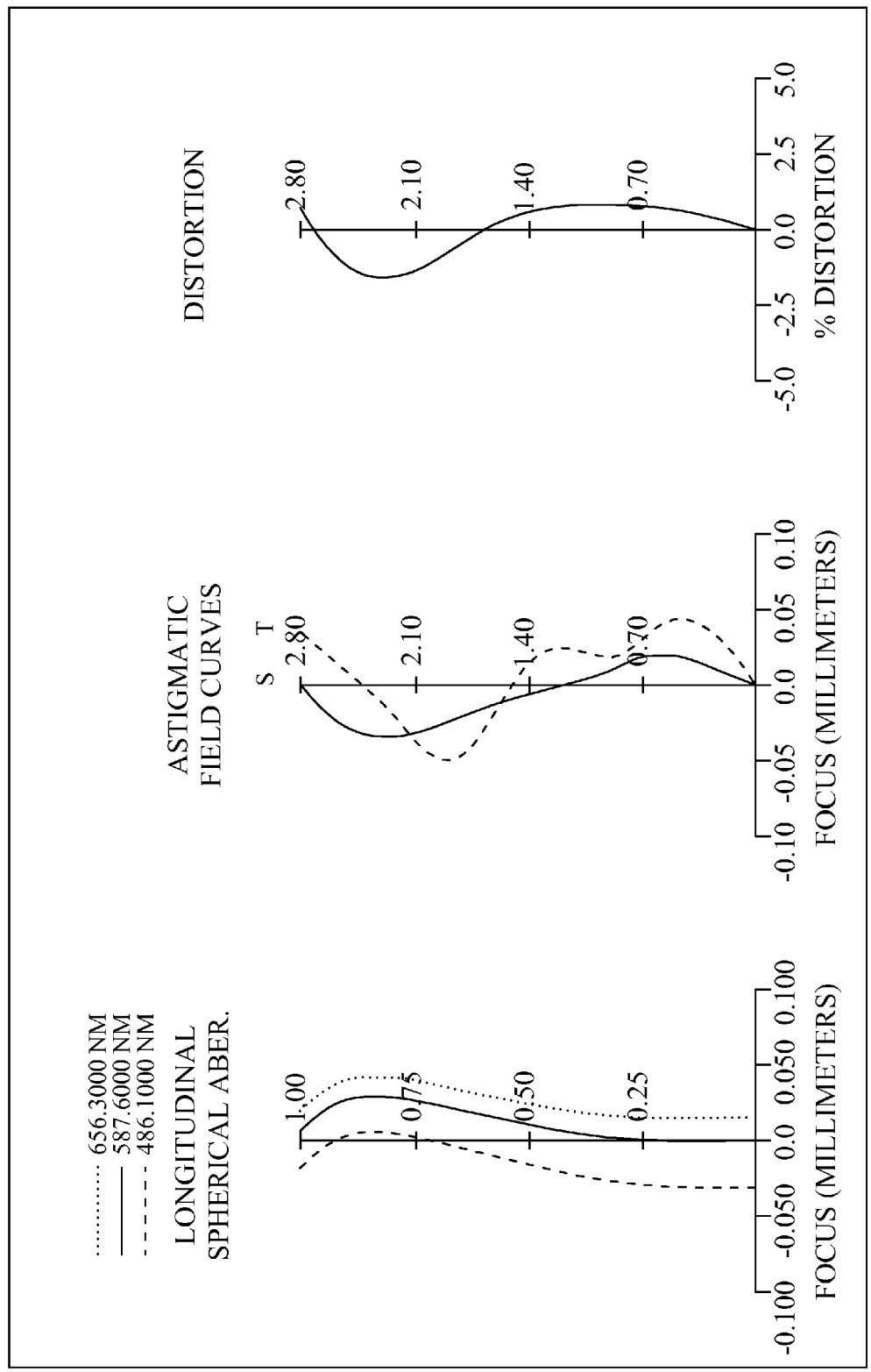
FIG. 4B is a series of aberration curves of the fourth preferred embodiment of the present invention.

FIG. 4A is for a schematic view of an optical lens assembly for image photographing in accordance with the fourth preferred embodiment of the present invention, and FIG. 4B is for a series of aberration curves of the fourth preferred embodiment of the present invention. The optical lens assembly for image photographing of the fourth embodiment comprises an aperture stop (400), four lens elements, an IR-filter (460) and an image sensor (480) to constitute the optical lens assembly for image photographing with a larger view angle. The optical system, sequentially from an object side to an image side along an optical axis comprises: a plastic first lens element (410) with positive refractive power having a convex object-side surface (411) and a concave image-side surface (412), and both object-side surface (411) and image-side surface (412) being aspheric; a second lens element (420) with positive refractive power, made of plastic, having a convex object-side surface (421) and a concave image-side surface (422), and both object-side surface (421) and image-side surface (422) being aspheric; a third lens element (430) with positive refractive power, made of plastic, having a concave object-side surface (431) and a convex image-side surface (432), and both object-side surface (431) and image-side surface (432) being aspheric; a fourth lens element with negative refractive power (440), made of plastic, having a convex object-side surface (441) and a concave image-side surface (442), both object-side surface (441) and image-side surface (442) being aspheric, and each surface thereof having at least one inflection point; the IR-filter (460) made of glass being a flat glass and without influences on the focal length of the optical lens assembly for image photographing of the present invention; and the image sensor (480) installed on the image plane (470). In this preferred embodiment, the aperture stop (400) is a front aperture stop formed between the first lens element (410) and a photographed object.

The optical data of the optical lens assembly for image photographing of this preferred embodiment are listed in Table 4-1 as follows:

TABLE 4-1 f = 3.71 mm, Fno = 2.80, HFOV = 36.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.062 | | | | |
| 2 | Lens 1 | 2.352280 (ASP) | 0.394 | Plastic | 1.530 | 55.8 | 17.18 |
| 3 | | 2.987790 (ASP) | 0.122 | | | | |
| 4 | Lens 2 | 1.550850 (ASP) | 0.307 | Plastic | 1.530 | 55.8 | 14.97 |
| 5 | | 1.795380 (ASP) | 0.679 | | | | |
| 6 | Lens 3 | −4.446700 (ASP) | 0.904 | Plastic | 1.530 | 55.8 | 2.91 |
| 7 | | −1.225940 (ASP) | 0.070 | | | | |
| 8 | Lens 4 | 1.670460 (ASP) | 0.427 | Plastic | 1.650 | 21.4 | −4.86 |
| 9 | | 0.982440 (ASP) | 1.000 | | | | |
| 10 | IR-filter | Plano | 0.300 | Glass | 1.517 | 64.2 | — |
| 11 | | Plano | 0.914 | | | | |
| 12 | Image | Plano | — | | | | |

Note:
Reference wavelength is 587.6 nm.
ASP stands for aspherical surfaces

Wherein, the object-side surface and the image-side surface of the first lens element (410) to the fourth lens element (440) comply with the aspheric surface formula as given in condition (15), and the aspheric coefficients are listed in Table 4-2 as follows:

TABLE 4-2

Aspheric Coefficients

| Surface # | 2 | 3 | 4 | 5 |
|---|---|---|---|---|
| k = | −1.71301E+00 | −1.00000E+00 | −1.00000E+00 | −1.00000E+00 |
| A4 = | −1.74178E−02 | −4.42725E−01 | −6.14573E−01 | −2.64122E−01 |
| A6 = | 1.03426E−01 | 5.77351E−01 | 7.91905E−02 | −1.75890E−01 |
| A8 = | 2.48839E−02 | −3.11675E−01 | 4.22834E−01 | 4.08447E−01 |

TABLE 4-2-continued

| Aspheric Coefficients | | | | |
|---|---|---|---|---|
| A10 = | −5.94096E−01 | −5.07007E−01 | −3.01918E−01 | −2.04140E−01 |
| A12 = | 6.99307E−01 | 4.70876E−01 | −5.02189E−01 | 7.63956E−02 |
| A14 = | 4.97245E−01 | 4.22237E−01 | 6.13552E−02 | −2.54666E−02 |
| A16 = | −7.36173E−01 | −6.38966E−02 | 8.54527E−01 | 1.89305E−01 |

| Surface # | 6 | 7 | 8 | 9 |
|---|---|---|---|---|
| k = | −1.75618E+02 | −7.27874E−01 | −1.34957E+01 | −4.73010E+00 |
| A4 = | −9.05403E−02 | 4.27081E−02 | −1.12312E−01 | −1.43307E−01 |
| A6 = | 1.97882E−01 | 4.01417E−02 | −4.59464E−02 | 3.43014E−02 |
| A8 = | −3.64373E−01 | −1.46595E−01 | 6.67763E−03 | −7.29121E−03 |
| A10 = | 2.34801E−01 | 9.29328E−02 | 2.31878E−03 | 1.04921E−03 |
| A12 = | −5.21143E−02 | −1.21316E−03 | 3.85440E−04 | −1.16891E−05 |
| A14 = | −6.40847E−03 | −2.58930E−02 | 2.50585E−04 | −3.60619E−05 |
| A16 = | 4.50485E−03 | 9.08845E−03 | −4.26252E−05 | 9.55771E−06 |

In the optical lens assembly for image photographing of this preferred embodiment, the relation of each variable (f, Fno, HFOV, $f_1$, $f_2$, $v_3$, $v_4$, $R_2$, $R_8$, $T_{23}$, $T_{34}$, $CT_1$, $CT_4$, $pow_1$, $pow_2$, $pow_3$, $pow_4$, SL, TTL and ImgH) is defined as mentioned before, thus will not be described here again. Data of related relations are listed in Table 4-3 as follows:

TABLE 4-3

| Relation | Data | Relation | Data |
|---|---|---|---|
| f(mm) | 3.71 | $R_8/R_7$ | 0.59 |
| Fno | 2.80 | $f/f_1$ | 0.22 |
| HFOV | 36.8 | $f/f_2$ | 0.25 |
| $v_3 - v_4$ | 34.4 | $(pow_1 + pow_2)/(pow_3 - pow_4)$ | 0.23 |
| $CT_1/CT_4$ | 0.92 | SL/TTL | 0.99 |
| $T_{34}/T_{23}$ | 0.10 | TTL/ImgH | 1.79 |

According to the optical data as shown in Table 4-1 and the aberration curve as shown in FIG. 4B, the optical lens assembly for image photographing in accordance with this preferred embodiment of the present invention provides good correction results in aspects of the longitudinal spherical aberration, astigmatic field curving, and distortion.

<Fifth Preferred Embodiment>

Figure 5A:
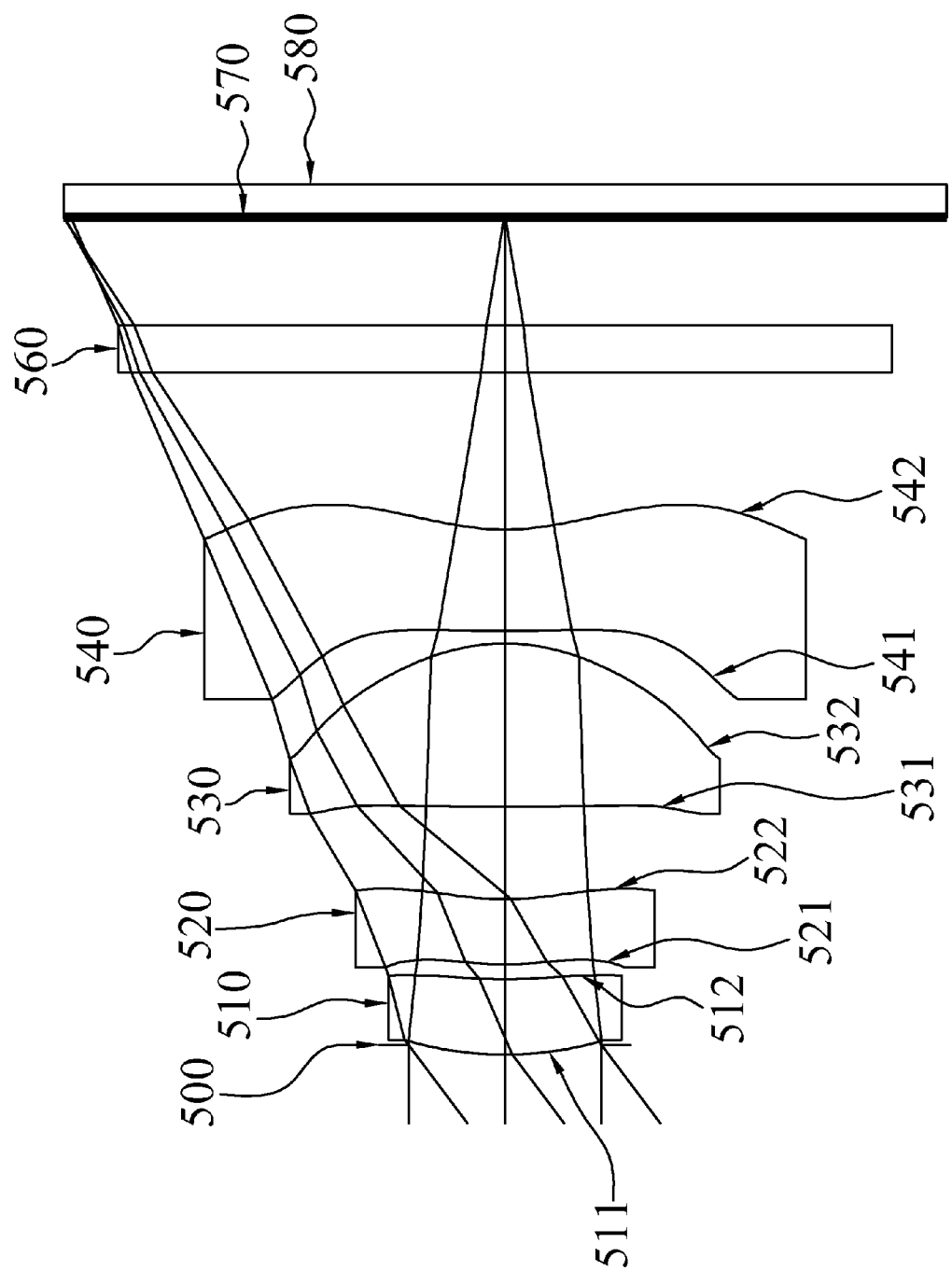
FIG. 5A is a schematic view of an optical lens assembly for image photographing in accordance with the fifth preferred embodiment of the present invention.
Figure 5B:
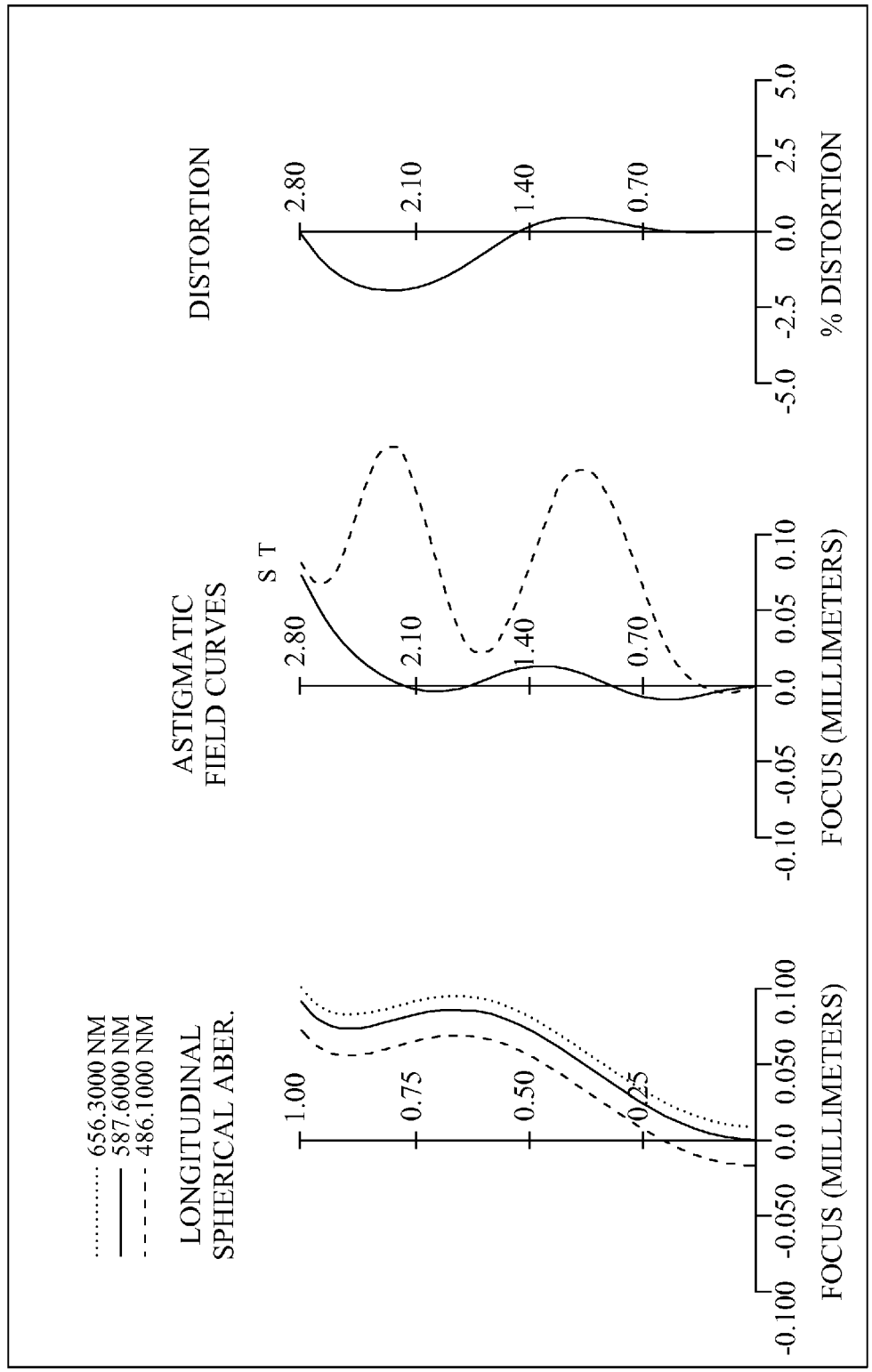
FIG. 5B is a series of aberration curves of the fifth preferred embodiment of the present invention.

FIG. 5A is for a schematic view of an optical lens assembly for image photographing in accordance with the fifth preferred embodiment of the present invention, and FIG. 5B is for a series of aberration curves of the fifth preferred embodiment of the present invention. The optical lens assembly for image photographing comprises an aperture stop (500), four lens elements, an IR-filter (560) and an image sensor (580) to constitute the optical lens assembly for image photographing with a larger view angle. The optical system, sequentially from an object side to an image side along an optical axis comprises: a plastic first lens element (510) with positive refractive power having a convex object-side surface (511) and a concave image-side surface (512), and both object-side surface (511) and image-side surface (512) being aspheric; a second lens element (520) with positive refractive power, made of plastic, having a convex object-side surface (521) and a concave image-side surface (522), and both object-side surface (521) and image-side surface (522) being aspheric; a third lens element (530) with positive refractive power, made of plastic, having a convex object-side surface (531) and a convex image-side surface (532), and both object-side surface (531) and image-side surface (532) being aspheric; a fourth lens element with negative refractive power (540), made of plastic, having a convex object-side surface (541) and a concave image-side surface (542), both object-side surface (541) and image-side surface (542) being aspheric, and each surface thereof having at least one inflection point; the IR-filter (560) made of glass being a flat glass and without influences on the focal length of the optical lens assembly for image photographing of the present invention; and the image sensor (580) installed on the image plane (570). In this preferred embodiment, the aperture stop (500) is a front aperture stop formed between the first lens element (510) and a photographed object.

The optical data of the optical lens assembly for image photographing of this preferred embodiment are listed in Table 5-1 as follows:

TABLE 5-1

| f = 3.68 mm, Fno = 3.00, HFOV = 36.9 deg. | | | | | | | |
|---|---|---|---|---|---|---|---|
| Surface # | | Curvature Radius | Thickness | Material | Index | Abbe # | Focal length |
| 0 | Object | Plano | Infinity | | | | |
| 1 | Ape. Stop | Plano | −0.062 | | | | |
| 2 | Lens 1 | 2.311130 (ASP) | 0.479 | Plastic | 1.544 | 55.9 | 17.42 |
| 3 | | 2.832840 (ASP) | 0.095 | | | | |
| 4 | Lens 2 | 1.900610 (ASP) | 0.415 | Plastic | 1.544 | 55.9 | 30.03 |
| 5 | | 1.985260 (ASP) | 0.588 | | | | |
| 6 | Lens 3 | 30.864200 (ASP) | 1.039 | Plastic | 1.544 | 55.9 | 2.21 |
| 7 | | −1.236450 (ASP) | 0.080 | | | | |
| 8 | Lens 4 | 9.051500 (ASP) | 0.644 | Plastic | 1.634 | 23.8 | −3.19 |
| 9 | | 1.609130 (ASP) | 1.000 | | | | |
| 10 | IR-filter | Plano | 0.300 | Glass | 1.517 | 64.2 | — |

TABLE 5-1-continued f = 3.68 mm, Fno = 3.00, HFOV = 36.9 deg.

| Surface # | | Curvature Radius | Thickness | Material | Index | Abbe # | Focal length |
|---|---|---|---|---|---|---|---|
| 11 | | Plano | 0.689 | | | | |
| 12 | Image | Plano | — | | | | |

Note:
Reference wavelength is 587.6 nm.
ASP stands for aspherical surfaces

Wherein, the object-side surface and the image-side surface of the first lens element (510) to the fourth lens element (540) comply with the aspheric surface formula as given in condition (15), and the aspheric coefficients are listed in Table 5-2 as follows:

TABLE 5-2

Aspheric Coefficients

| Surface # | 2 | 3 | 4 | 5 |
|---|---|---|---|---|
| k = | 2.60709E−02 | 5.79947E+00 | −9.58880E−01 | −2.36126E+00 |
| A4 = | −1.44255E−02 | −5.04012E−01 | −6.83135E−01 | −2.17306E−01 |
| A6 = | 7.94730E−02 | 5.77870E−01 | 2.73458E−01 | −1.49932E−01 |
| A8 = | 2.53523E−01 | 2.18875E−02 | 4.46726E−01 | 3.83983E−01 |
| A10 = | −8.97955E−01 | −8.91077E−01 | −5.33363E−01 | −1.86991E−01 |
| A12 = | 7.02222E−01 | 3.36404E−01 | −5.43744E−01 | 4.79017E−02 |
| A14 = | 3.32559E−01 | 2.83737E−02 | −1.51140E−02 | −2.80918E−01 |
| A16 = | −7.53066E−01 | 1.59856E−02 | 5.55549E−01 | 2.22999E−01 |

| Surface # | 6 | 7 | 8 | 9 |
|---|---|---|---|---|
| k = | −1.00000E+00 | −8.72530E−01 | 7.79097E+00 | −4.08006E+00 |
| A4 = | −4.79108E−02 | 5.48451E−02 | −9.46059E−02 | −1.26397E−01 |
| A6 = | 2.24030E−01 | 5.04545E−02 | −3.97689E−02 | 3.52907E−02 |
| A8 = | −3.69992E−01 | −1.39713E−01 | 5.41886E−03 | −7.60679E−03 |
| A10 = | 2.29079E−01 | 9.18406E−02 | 2.06539E−03 | 1.07684E−03 |
| A12 = | −5.29993E−02 | −2.68798E−03 | 2.07334E−04 | 1.28284E−05 |
| A14 = | −6.16274E−03 | −2.64730E−02 | 2.45773E−04 | −3.83889E−05 |
| A16 = | 4.97378E−03 | 9.16118E−03 | −7.09115E−06 | 5.52726E−06 |

In the optical lens assembly for image photographing of this preferred embodiment, the relation of each variable (f, Fno, HFOV, $f_1$, $f_2$, $v_3$, $v_4$, $R_2$, $R_8$, $T_{23}$, $T_{34}$, $CT_1$, $CT_4$, $pow_1$, $pow_2$, $pow_3$, $pow_4$, SL, TTL and ImgH) is defined as mentioned before, thus will not be described here again. Data of related relations are listed in Table 5-3 as follows:

TABLE 5-3

| Relation | Data | Relation | Data |
|---|---|---|---|
| f(mm) | 3.68 | $R_8/R_7$ | 0.18 |
| Fno | 3.00 | $f/f_1$ | 0.21 |
| HFOV | 36.9 | $f/f_2$ | 0.12 |
| $v_3 - v_4$ | 32.1 | $(pow_1 + pow_2)/(pow_3 - pow_4)$ | 0.12 |
| $CT_1/CT_4$ | 0.74 | SL/TTL | 0.99 |
| $T_{34}/T_{23}$ | 0.14 | TTL/ImgH | 1.87 |

According to the optical data as shown in Table 5-1 and the aberration curve as shown in FIG. 5B, the optical lens assembly for image photographing in accordance with this preferred embodiment of the present invention provides good correction results in aspects of the longitudinal spherical aberration, astigmatic field curving, and distortion.

<Sixth Preferred Embodiment>

Figure 6A:
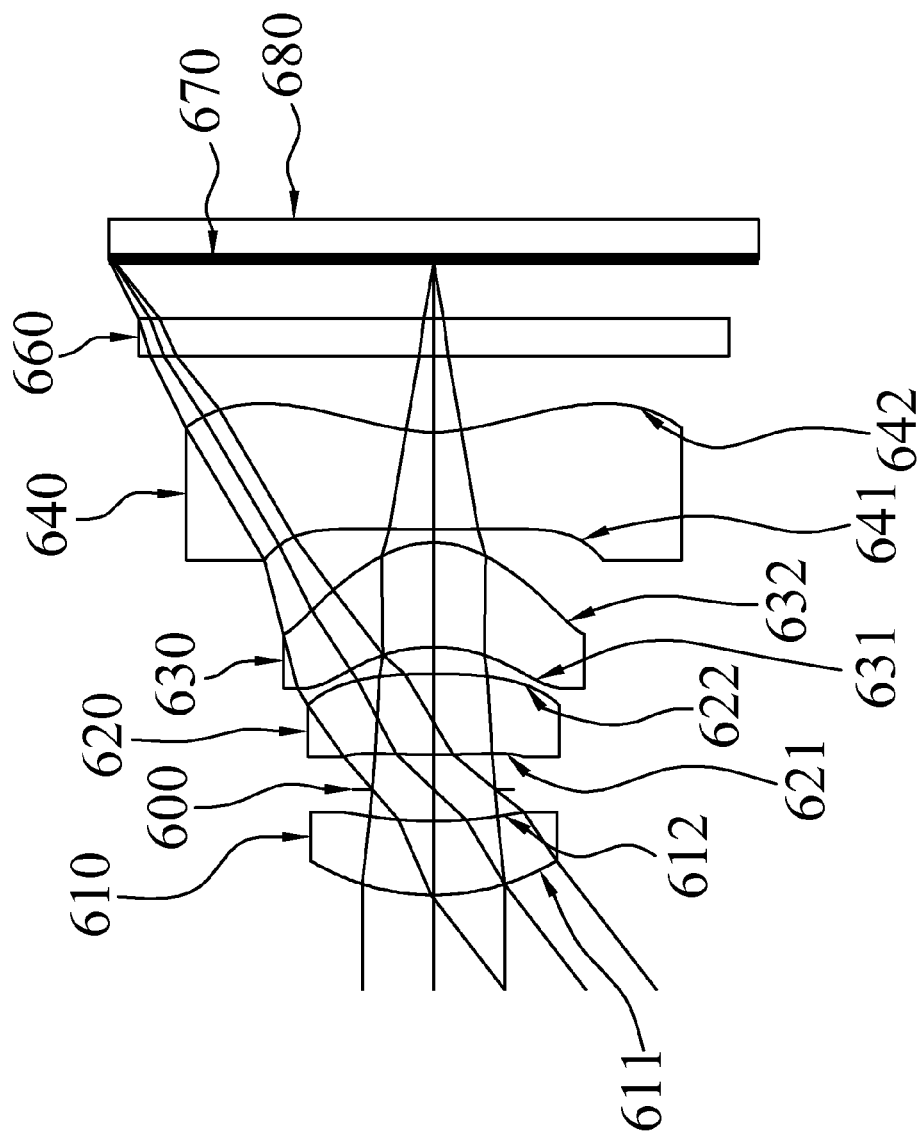
FIG. 6A is a schematic view of an optical lens assembly for image photographing in accordance with the sixth preferred embodiment of the present invention.
Figure 6B:
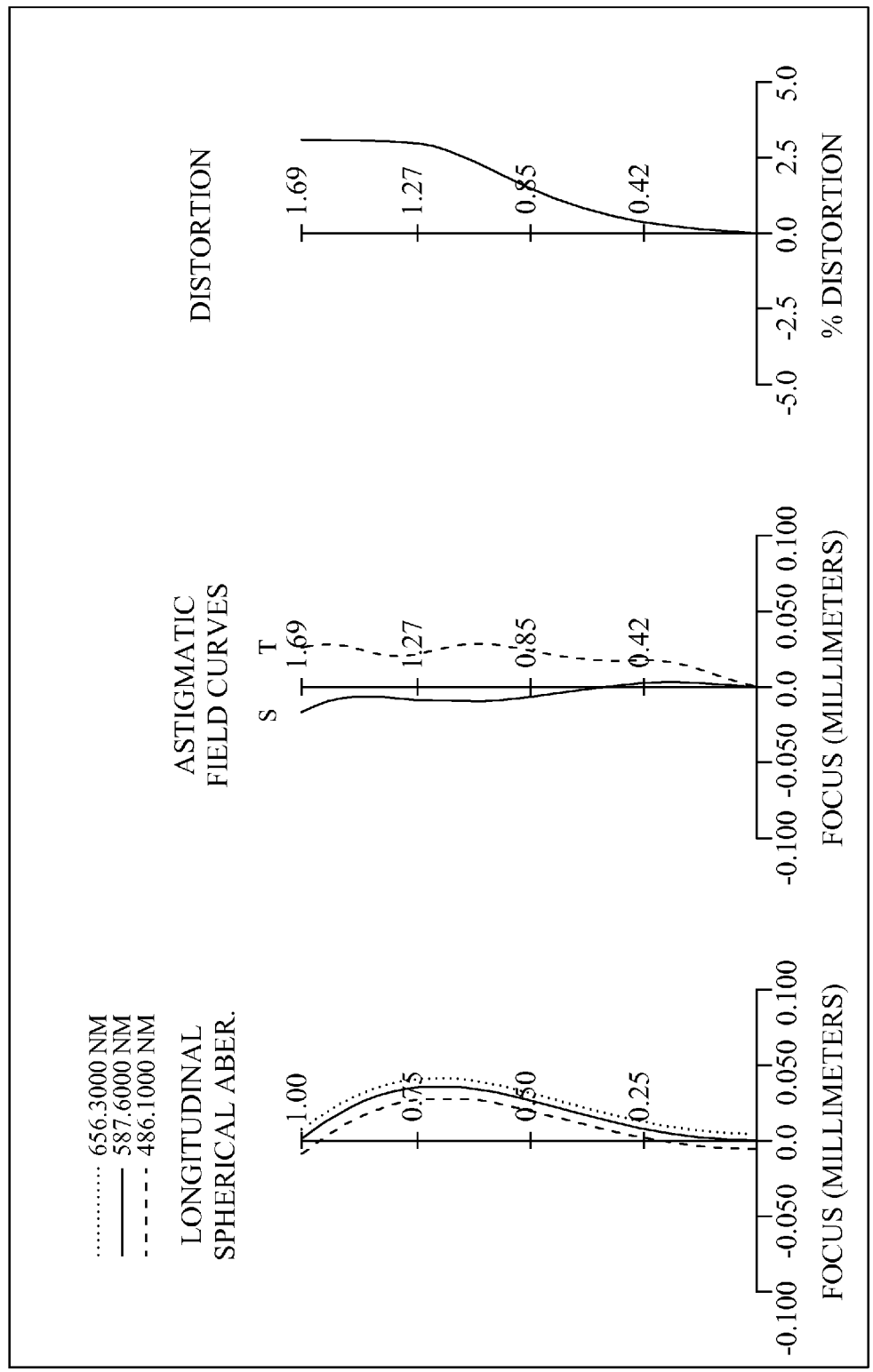
FIG. 6B is a series of aberration curves of the sixth preferred embodiment of the present invention.

FIG. 6A is for a schematic view of an optical lens assembly for image photographing in accordance with the sixth preferred embodiment of the present invention, and FIG. 6B is for a series of aberration curves of the sixth preferred embodiment of the present invention. The optical lens assembly for image photographing primarily comprises an aperture stop (600), four lens elements, an IR-filter (660) and an image sensor (680) to constitute the optical lens assembly for image photographing with a larger view angle. The optical system, sequentially from an object side to an image side along an optical axis comprises: a plastic first lens element (610) with positive refractive power having a convex object-side surface (611) and a concave image-side surface (612), and both object-side surface (611) and image-side surface (612) being aspheric; a second lens element (620) with positive refractive power, made of plastic, having a convex object-side surface (621) and a convex image-side surface (622), and both object-side surface (621) and image-side surface (622) being aspheric; a third lens element (630) with positive refractive power, made of plastic, having a concave object-side surface (631) and a convex image-side surface (632), and both object-side surface (631) and image-side surface (632) being aspheric; a fourth lens element with negative refractive power (640), made of plastic, having a convex object-side surface (641) and a concave image-side surface (642), both object-side surface (641) and image-side surface (642) being aspheric, and each surface thereof having at least one inflection point; the IR-filter (660) made of glass being a flat glass and without influences on the focal length of the optical lens assembly for image photographing of the present invention; and the image sensor (680) installed on the image plane (670). In this preferred embodiment, the aperture stop (600) is a middle aperture stop formed between the first lens element (610) and the second lens element (620).

The optical data of the optical lens assembly for image photographing of this preferred embodiment are listed in Table 6-1 as follows:

TABLE 6-1 f = 2.10 mm, Fno = 2.80, HFOV = 37.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.318730 (ASP) | 0.389 | Plastic | 1.535 | 56.3 | 4.85 |
| 2 | | 2.406920 (ASP) | 0.167 | | | | |
| 3 | Ape. Stop | Plano | 0.182 | | | | |
| 4 | Lens 2 | 4.545000 (ASP) | 0.426 | Plastic | 1.535 | 56.3 | 3.62 |
| 5 | | −3.260800 (ASP) | 0.140 | | | | |
| 6 | Lens 3 | −0.853930 (ASP) | 0.551 | Plastic | 1.530 | 55.8 | 1.36 |
| 7 | | −0.477620 (ASP) | 0.070 | | | | |
| 8 | Lens 4 | 30.288100 (ASP) | 0.510 | Plastic | 1.650 | 21.4 | −1.37 |
| 9 | | 0.861320 (ASP) | 0.400 | | | | |
| 10 | IR-filter | Plano | 0.200 | Glass | 1.517 | 64.2 | — |
| 11 | | Plano | 0.313 | | | | |
| 12 | Image | Plano | — | | | | |

Note:
Reference wavelength is 587.6 nm.
ASP stands for aspherical surfaces

Wherein, the object-side surface and the image-side surface of the first lens element (610) to the fourth lens element (640) comply with the aspheric surface formula as given in condition (15), and the aspheric coefficients are listed in Table 6-2 as follows:

TABLE 6-2

Aspheric Coefficients

| Surface # | 1 | 2 | 4 | 5 |
|---|---|---|---|---|
| k = | −4.86549E+00 | 1.93594E+01 | −1.00000E+00 | −1.09993E+01 |
| A4 = | 3.66915E−01 | −7.19486E−02 | −5.08257E−01 | −4.82898E−01 |
| A6 = | −8.15332E−01 | −1.24864E−01 | 1.16273E+00 | −2.59194E−01 |
| A8 = | 4.59317E+00 | −7.60370E+00 | −1.16183E+01 | 1.51794E+00 |
| A10 = | −1.49817E+01 | 2.99935E+01 | 2.66815E+01 | 1.63996E−01 |
| A12 = | 2.42373E+01 | −7.04185E+01 | −4.29398E+00 | −1.50903E+01 |
| A14 = | −1.75759E+01 | −5.08087E+01 | −3.62207E+02 | 1.82524E+01 |

| Surface # | 6 | 7 | 8 | 9 |
|---|---|---|---|---|
| k = | −1.94279E+00 | −2.77937E+00 | 2.79977E+01 | −9.74026E+00 |
| A4 = | −8.24593E−01 | −9.28037E−01 | 4.56602E−02 | −1.20888E−01 |
| A6 = | 3.99188E+00 | 2.27822E+00 | −4.90615E−01 | 5.25785E−02 |
| A8 = | −1.63905E+01 | −4.17980E+00 | 2.52637E−01 | −7.67399E−02 |
| A10 = | 5.26147E+01 | 3.76527E+00 | −1.45221E−01 | 4.91384E−02 |
| A12 = | −7.47333E+01 | −1.00123E+00 | −6.49306E−02 | −1.53454E−02 |
| A14 = | 3.78742E+01 | 1.20351E+00 | 2.11778E−03 | 1.79871E−03 |

According to the optical data as shown in Table 6-1 and the aberration curve as shown in FIG. 6B, the optical lens assembly for image photographing in accordance with this preferred embodiment of the present invention provides good correction results in aspects of the longitudinal spherical aberration, astigmatic field curving, and distortion.

In the optical lens assembly for image photographing of this preferred embodiment, the relation of each variable (f, Fno, HFOV, $f_1$, $f_2$, $v_3$, $v_4$, $R_2$, $R_8$, $T_{23}$, $T_{34}$, $CT_1$, $CT_4$, $pow_1$, $pow_2$, $pow_3$, $pow_4$, SL, TTL and ImgH) is defined as mentioned before, thus will not be described here again. Data of related relations are listed in Table 6-3 as follows:

TABLE 6-3

| Relation | Data | Relation | Data |
|---|---|---|---|
| f(mm) | 2.10 | $R_8/R_7$ | 0.03 |
| Fno | 2.80 | $f/f_1$ | 0.43 |
| HFOV | 37.8 | $f/f_2$ | 0.58 |
| $v_3 - v_4$ | 34.4 | $(pow_1 + pow_2)/(pow_3 - pow_4)$ | 0.33 |
| $CT_1/CT_4$ | 0.76 | SL/TTL | 0.83 |
| $T_{34}/T_{23}$ | 0.50 | TTL/ImgH | 1.94 |

<Seventh Preferred Embodiment>

Figure 7A:
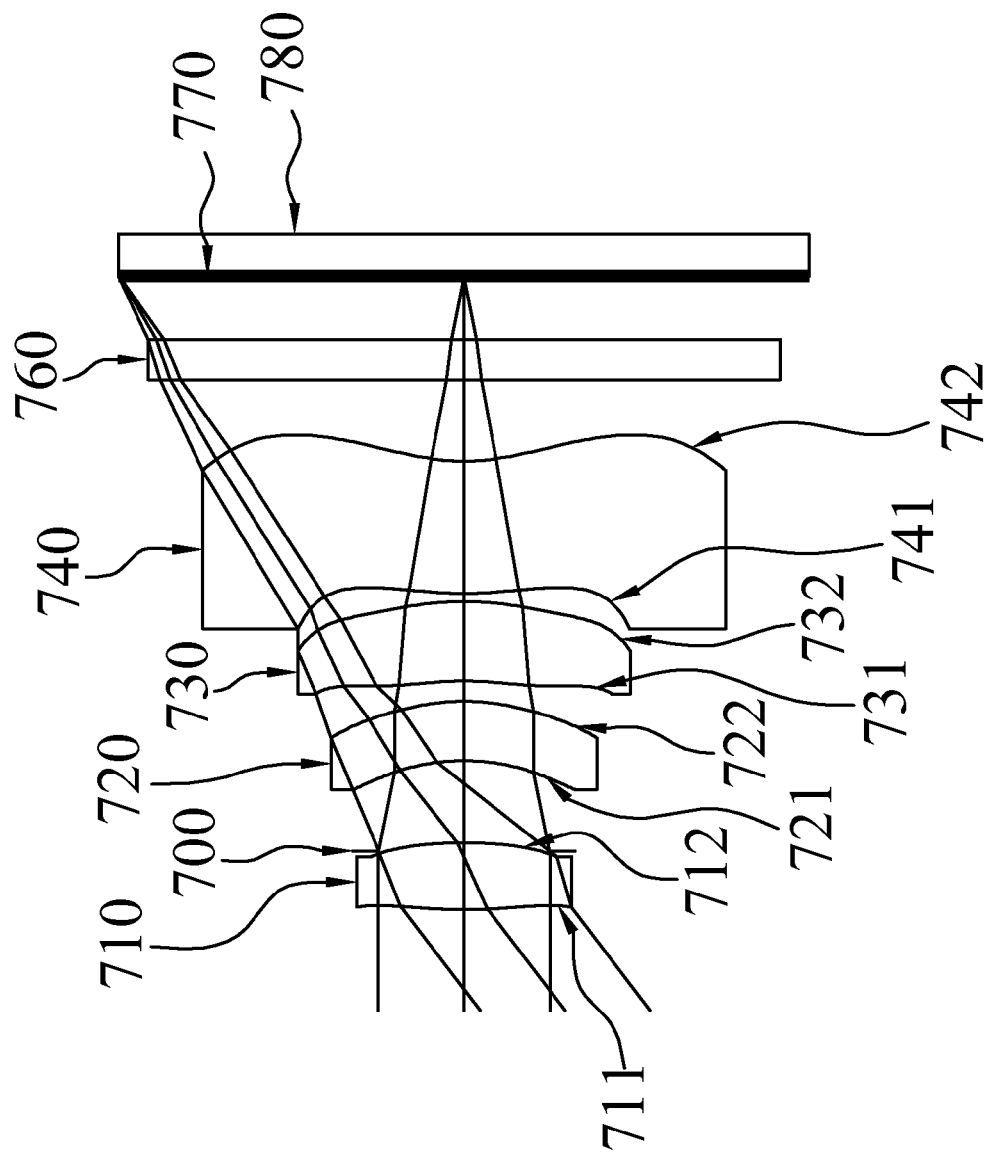
FIG. 7A is a schematic view of an optical lens assembly for image photographing in accordance with the seventh preferred embodiment of the present invention.
Figure 7B:
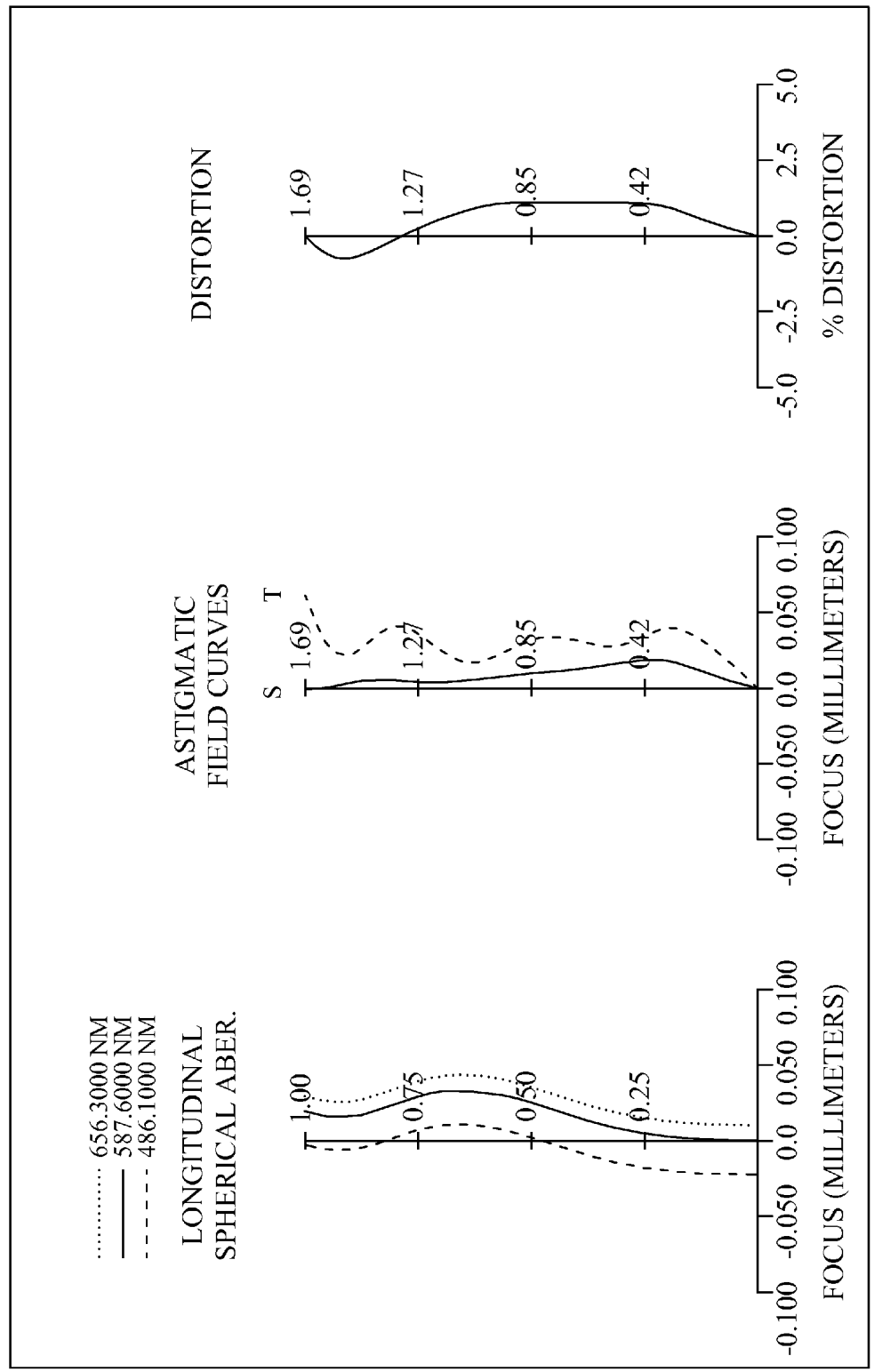
FIG. 7B is a series of aberration curves of the seventh preferred embodiment of the present invention.

FIG. 7A is for a schematic view of an optical lens assembly for image photographing in accordance with the seventh preferred embodiment of the present invention, and FIG. 7B is for a series of aberration curves of the seventh preferred embodiment of the present invention. The optical lens assembly for image photographing mainly comprises an aperture stop (700), four lens elements, an IR-filter (760) and an image sensor (780) to constitute the optical lens assembly for image photographing with a larger view angle. The optical system, sequentially from an object side to an image side along an optical axis comprises: a plastic first lens element (710) with positive refractive power having a convex object-side surface (711) and a convex image-side surface (712), and both object-side surface (711) and image-side surface (712) being aspheric; a second lens element (720) with positive refractive power, made of plastic, having a concave object-side surface (721) and a convex image-side surface (722), and both object-side surface (721) and image-side surface (722) being aspheric; a third lens element (730) with positive refractive power, made of plastic, having a concave object-side surface (731) and a convex image-side surface (732), and both object-side surface (731) and image-side surface (732) being aspheric; a fourth lens element with negative refractive power (740), made of plastic, having a convex object-side surface (741) and a concave image-side surface (742), both object-side surface (741) and image-side surface (742) being aspheric, and each surface thereof having at least one inflection point; the IR-filter (760) made of glass being a flat glass and without influences on the focal length of the optical lens assembly for image photographing of the present invention; and the image sensor (780) installed on the image plane (770). In this preferred embodiment, the aperture stop (700) is a middle aperture stop formed between the first lens element (710) and the second lens element (720).

The optical data of the optical lens assembly for image photographing of this preferred embodiment are listed in Table 7-1 as follows:

In the optical lens assembly for image photographing of this preferred embodiment, the relation of each variable (f, Fno, HFOV, $f_1$, $f_2$, $v_3$, $v_4$, $R_2$, $R_8$, $T_{23}$, $T_{34}$, $CT_1$, $CT_4$, $pow_1$, $pow_2$, $pow_3$, $pow_4$, SL, TTL and ImgH) is defined in the first preferred embodiment, thus will not be described here again. Data of related relations are listed in Table 7-3 as follows:

TABLE 7-3

| Relation | Data | Relation | Data |
|---|---|---|---|
| f(mm) | 2.20 | $R_8/R_7$ | 0.54 |
| Fno | 2.60 | $f/f_1$ | 1.01 |
| HFOV | 37.4 | $f/f_2$ | 0.18 |
| $v_3 - v_4$ | 32.1 | $(pow_1 + pow_2)/(pow_3 - pow_4)$ | 1.96 |
| $CT_1/CT_4$ | 0.51 | SL/TTL | 0.91 |
| $T_{34}/T_{23}$ | 0.40 | TTL/ImgH | 1.80 |

TABLE 7-1 f = 2.20 mm, Fno = 2.60, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.555690 (ASP) | 0.329 | Plastic | 1.544 | 55.9 | 2.18 |
| 2 | | −2.113370 (ASP) | −0.041 | | | | |
| 3 | Ape. Stop | Plano | 0.445 | | | | |
| 4 | Lens 2 | −1.026550 (ASP) | 0.293 | Plastic | 1.544 | 55.9 | 12.40 |
| 5 | | −0.980630 (ASP) | 0.100 | | | | |
| 6 | Lens 3 | −1.355290 (ASP) | 0.392 | Plastic | 1.544 | 55.9 | 14.32 |
| 7 | | −1.272130 (ASP) | 0.040 | | | | |
| 8 | Lens 4 | 1.921720 (ASP) | 0.651 | Plastic | 1.634 | 23.8 | −4.87 |
| 9 | | 1.028680 (ASP) | 0.400 | | | | |
| 10 | IR-filter | Plano | 0.200 | Glass | 1.517 | 64.2 | — |
| 11 | | Plano | 0.313 | | | | |
| 12 | Image | Plano | — | | | | |

Note:
Reference wavelength is 587.6 nm.
ASP stands for aspherical surfaces

Wherein, the object-side surface and the image-side surface of the first lens element (710) to the fourth lens element (740) comply with the aspheric surface formula as given in condition (15), and the aspheric coefficients are listed in Table 7-2 as follows:

According to the optical data as shown in Table 7-1 and the aberration curve as shown in FIG. 7B, the optical lens assembly for image photographing in accordance with this preferred embodiment of the present invention provides good

TABLE 7-2

Aspheric Coefficients

| Surface # | 1 | 2 | 4 | 5 |
|---|---|---|---|---|
| k = | −5.00000E+01 | 4.48476E+00 | −1.00000E+00 | 8.46549E−01 |
| A4 = | 2.64285E−02 | −3.67548E−01 | −4.15842E−01 | 9.19640E−01 |
| A6 = | −1.53304E+00 | 1.28552E+00 | 2.91656E+00 | −9.18498E−01 |
| A8 = | 1.77197E+00 | −1.66155E+01 | 6.99294E−01 | 4.98548E−01 |
| A10 = | −9.82509E+00 | 6.99811E+01 | −7.56293E+01 | 5.23165E−01 |
| A12 = | 3.02281E+01 | −9.51422E+01 | 2.91917E+02 | −1.10786E+01 |
| A14 = | −5.47439E+01 | −5.07121E+01 | −3.34071E+02 | 2.76037E+01 |

| Surface # | 6 | 7 | 8 | 9 |
|---|---|---|---|---|
| k = | −3.79381E+01 | −2.84296E+01 | 1.65013E+00 | −5.90907E+00 |
| A4 = | 5.23072E−01 | −3.89676E−01 | −6.16015E−01 | −2.63883E−01 |
| A6 = | 2.08744E+00 | 1.92783E+00 | −2.93905E−01 | 1.71047E−01 |
| A8 = | −1.85360E+01 | −4.30613E+00 | 9.09998E−01 | −1.21653E−01 |
| A10 = | 5.21574E+01 | 3.61794E+00 | −8.19278E−01 | 5.01993E−02 |
| A12 = | −7.26997E+01 | −1.76083E+00 | −1.43524E+00 | −1.66989E−02 |
| A14 = | 3.91002E+01 | 1.24751E−01 | 6.64409E−01 | 3.76175E−03 | correction results in aspects of the longitudinal spherical aberration, astigmatic field curving, and distortion.

<Eighth Preferred Embodiment>

Figure 8A:
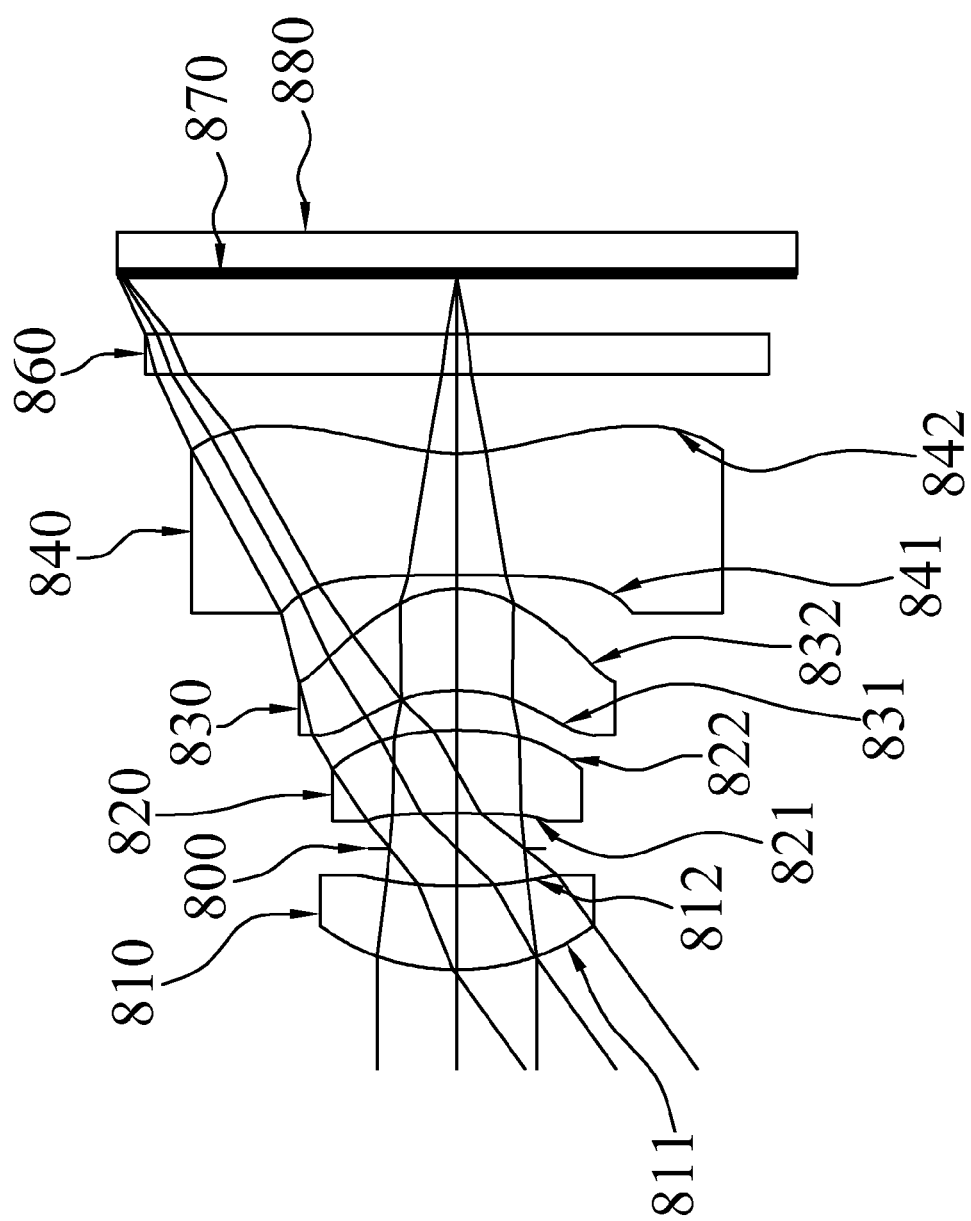
FIG. 8A is a schematic view of an optical lens assembly for image photographing in accordance with the eighth preferred embodiment of the present invention.
Figure 8B:
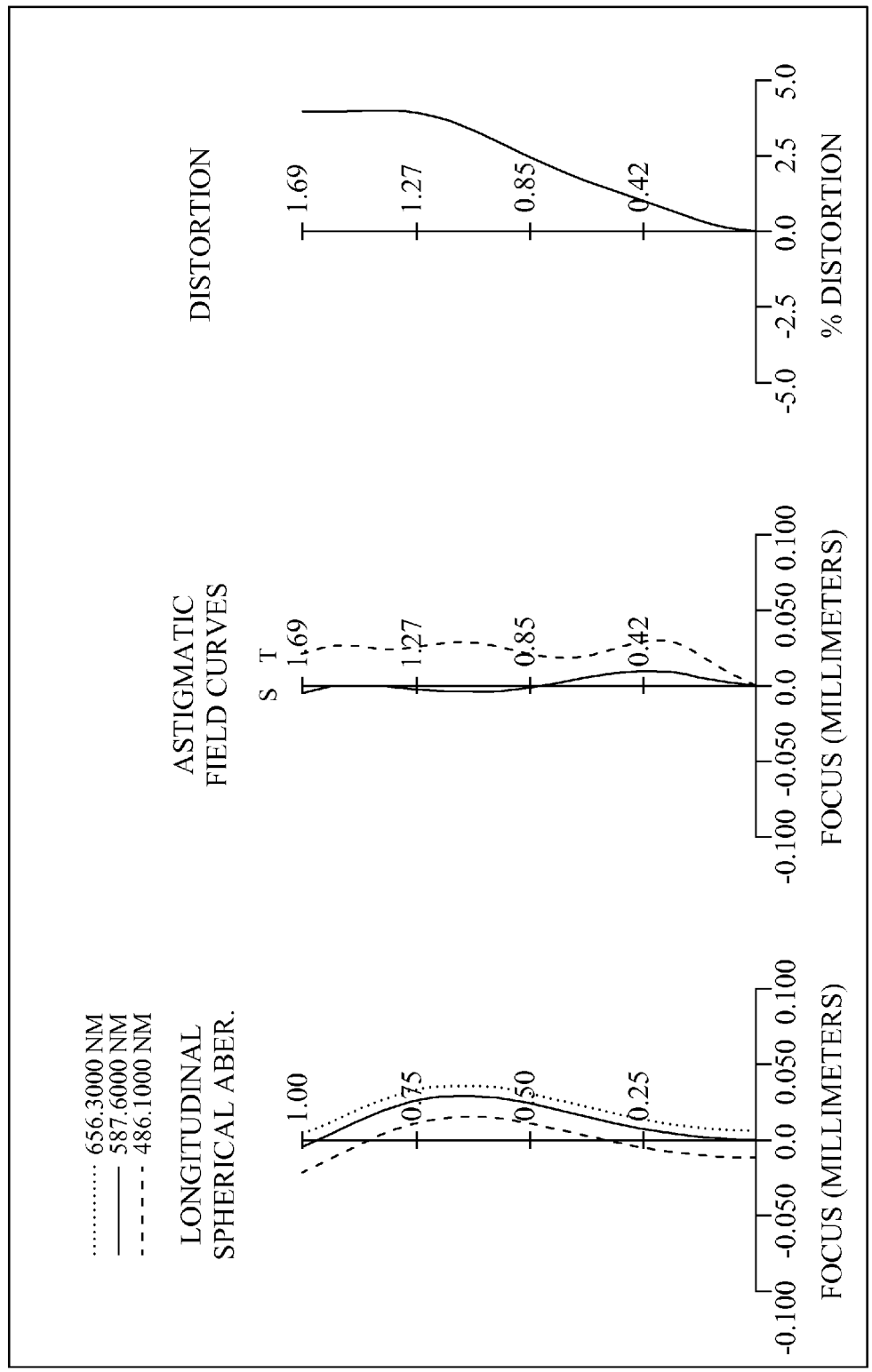
FIG. 8B is a series of aberration curves of the eighth preferred embodiment of the present invention.

FIG. 8A is for a schematic view of an optical lens assembly for image photographing in accordance with the eighth preferred embodiment of the present invention, and FIG. 8B is for a series of aberration curves of the eighth preferred embodiment of the present invention. The optical lens assembly for image photographing primarily comprises an aperture stop (800), four lens elements, an IR-filter (860) and an image sensor (880) to constitute the optical lens assembly for image photographing with a larger view angle. The optical system, sequentially from an object side to an image side along an optical axis comprises: a plastic first lens element (810) with positive refractive power having a convex object-side surface (811) and a concave image-side surface (812), and both object-side surface (811) and image-side surface (812) being aspheric; a second lens element (820) with positive refractive power, made of plastic, having a concave object-side surface (821) and a convex image-side surface (822), and both object-side surface (821) and image-side surface (822) being aspheric; a third lens element (830) with positive refractive power, made of plastic, having a concave object-side surface (831) and a convex image-side surface (832), and both object-side surface (831) and image-side surface (832) being aspheric; a fourth lens element with negative refractive power (840), made of plastic, having a concave object-side surface (841) and a concave image-side surface (842), both object-side surface (841) and image-side surface (842) being aspheric, and each surface thereof having at least one inflection point; the IR-filter (860) made of glass being a flat glass and without influences on the focal length of the optical lens assembly for image photographing of the present invention; and the image sensor (880) installed on the image plane (870). In this preferred embodiment, the aperture stop (800) is a middle aperture stop formed between the first lens element (810) and the second lens element (820).

The optical data of the optical lens assembly for image photographing of this preferred embodiment are listed in Table 8-1 as follows:

TABLE 8-1 f = 2.24 mm, Fno = 2.80, HFOV = 35.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.308360 (ASP) | 0.421 | Plastic | 1.534 | 55.1 | 4.50 |
| 2 | | 2.556160 (ASP) | 0.188 | | | | |
| 3 | Ape. Stop | Plano | 0.177 | | | | |
| 4 | Lens 2 | −13.503800 (ASP) | 0.418 | Plastic | 1.534 | 55.1 | 3.54 |
| 5 | | −1.674910 (ASP) | 0.200 | | | | |
| 6 | Lens 3 | −0.848060 (ASP) | 0.512 | Plastic | 1.534 | 55.1 | 1.60 |
| 7 | | −0.514200 (ASP) | 0.070 | | | | |
| 8 | Lens 4 | −9.270200 (ASP) | 0.612 | Plastic | 1.614 | 25.6 | −1.50 |
| 9 | | 1.049440 (ASP) | 0.400 | | | | |
| 10 | IR-filter | Plano | 0.200 | Glass | 1.517 | 64.2 | — |
| 11 | | Plano | 0.304 | | | | |
| 12 | Image | Plano | — | | | | |

Note:
Reference wavelength is 587.6 nm.
ASP stands for aspherical surfaces

Wherein, the object-side surface and the image-side surface of the first lens element (810) to the fourth lens element (840) comply with the aspheric surface formula as given in condition (15), and the aspheric coefficients are listed in Table 8-2 as follows:

TABLE 8-2

| Aspheric Coefficients | | | | |
|---|---|---|---|---|
| Surface # | 1 | 2 | 4 | 5 |
| k = | −4.51398E+00 | 2.02287E+01 | −1.00000E+00 | −2.72450E−02 |
| A4 = | 3.78994E−01 | 1.37584E−02 | −5.55188E−01 | −5.08557E−01 |
| A6 = | −7.81723E−01 | −1.11765E−01 | 7.65457E−01 | −2.04956E−01 |
| A8 = | 4.65682E+00 | −7.19402E+00 | −1.16918E+01 | 1.68149E+00 |
| A10 = | −1.49151E+01 | 3.33881E+01 | 2.70203E+01 | 3.59369E−01 |
| A12 = | 2.43889E+01 | −6.10195E+01 | −4.46606E+00 | −1.49787E+01 |
| A14 = | −1.64213E+01 | −5.08232E+01 | −3.61800E+02 | 1.86104E+01 |
| Surface # | 6 | 7 | 8 | 9 |
| k = | −1.88476E+00 | −2.87962E+00 | −5.00000E+01 | −1.02500E+01 |
| A4 = | −8.32830E−01 | −9.34856E−01 | 8.08533E−02 | −1.17097E−01 |
| A6 = | 3.97238E+00 | 2.27414E+00 | −5.50046E−01 | 5.74866E−02 |
| A8 = | −1.64256E+01 | −4.18205E+00 | 2.52386E−01 | −7.65647E−02 |
| A10 = | 5.25719E+01 | 3.76182E+00 | −1.03876E−01 | 4.94615E−02 |
| A12 = | −7.47312E+01 | −1.00885E+00 | −2.54336E−02 | −1.54741E−02 |
| A14 = | 3.80886E+01 | 1.18842E+00 | 4.88813E−03 | 1.74973E−03 |

In the optical lens assembly for image photographing of this preferred embodiment, the relation of each variable (f, Fno, HFOV, $f_1$, $f_2$, $v_3$, $v_4$, $R_7$, $R_8$, $T_{23}$, $T_{34}$, $CT_1$, $CT_4$, $pow_1$, $pow_2$, $pow_3$, $pow_4$, SL, TTL and ImgH) is defined in the first preferred embodiment, thus will not be described here again. Data of related relations are listed in Table 8-3 as follows:

TABLE 8-3

| Relation | Data | Relation | Data |
|---|---|---|---|
| f(mm) | 2.24 | $R_8/R_7$ | −0.11 |
| Fno | 2.80 | $f/f_1$ | 0.50 |
| HFOV | 35.9 | $f/f_2$ | 0.63 |
| $v_3 - v_4$ | 29.5 | $(pow_1 + pow_2)/(pow_3 - pow_4)$ | 0.39 |
| $CT_1/CT_4$ | 0.69 | SL/TTL | 0.82 |
| $T_{34}/T_{23}$ | 0.35 | TTL/ImgH | 2.03 |

According to the optical data as shown in Table 8-1 and the aberration curve as shown in FIG. 8B, the optical lens assembly for image photographing in accordance with this preferred embodiment of the present invention provides good correction results in aspects of the longitudinal spherical aberration, astigmatic field curving, and distortion.

In the optical lens assembly for image photographing of the present invention, the lens can be made of glass or plastic. If the lens is made of glass, the selectivity of configuring the refractive power of the optical lens assembly can be increased. If the lens is made of plastic, the production cost can be reduced effectively. In addition, an aspherical surface can be disposed on an optical surface of the lens, and the aspherical surface can be easily manufactured into shapes except spherical to have more control factors for eliminating aberrations, so as to reduce the number of used lenses and the total length of the optical lens assembly for image photographing of the present invention effectively.

In the optical lens assembly for image photographing of the present invention, if the lens surface is convex, the lens surface in proximity to the axis is convex. If the lens surface is concave, the lens surface in proximity to the axis is concave.

In the optical lens assembly for image photographing of the present invention, at least one stop such as a glare stop or a field stop is provided for reducing the stray light to improve the image quality.

Tables 1-1 to 8-3 show changes of different values of the optical lens assembly for image photographing in accordance with preferred embodiments of the present invention respectively. However, the changes of values in each preferred embodiments of the present invention are obtained from specific experiments, and even different values are used, products with the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

While the invention has been described by means of specific embodiments, numerous modifications and variations could be made thereto by those generally skilled in the art without departing from the scope and spirit of the invention set forth in the claims.

What is claimed is:

1. An optical lens assembly for image photographing, in order from an object side to an image side, comprising:
a first lens element with positive refractive power, having a convex object-side surface;
a second lens element with positive refractive power;
a third lens element with positive refractive power, having a convex image-side surface;
a fourth lens element with negative refractive power, made of plastic, having a concave image-side surface, both object-side surface and image-side surface being aspheric, and at least one surface having at least one inflection point;
wherein $T_{34}$ is an axial distance between the third lens element and the fourth lens element, $T_{23}$ is an axial distance between the second lens element and the third lens element, and the following condition is satisfied:

$$0.01 < T_{34}/T_{23} < 0.85.$$

2. The optical lens assembly for image photographing of claim 1, wherein f is a focal length of the optical lens assembly for image photographing, $f_1$ is a focal length of the first lens element, and the following condition is satisfied:

$$0.0 < f/f_1 < 1.2.$$

3. The optical lens assembly for image photographing of claim 2, further comprising a stop, wherein SL is an axial distance from the stop to an image plane, TTL is an axial distance from the object-side surface of the first lens element to the image plane, and the following condition is satisfied:

$$0.75 < SL/TTL < 1.1.$$

4. The optical lens assembly for image photographing of claim 3, wherein $pow_1$ is a ratio of the focal length f of the optical lens assembly for image photographing to the focal length $f_1$ of the first lens element, $pow_2$ is a ratio of the focal length f of the optical lens assembly for image photographing to the local length $f_2$ of the second lens element, $pow_3$ is a ratio of the focal length f of the optical lens assembly for image photographing to the focal length $f_3$ of the third lens element, $pow_4$ is a ratio of the focal length f of the optical lens assembly for image photographing to the focal length $f_4$ of the fourth lens element, and the following condition is satisfied:

$$(pow_1+pow_2)/(pow_3-pow_4)<0.7.$$

5. The optical lens assembly for image photographing of claim 4, wherein $pow_1$ is the ratio of the focal length f of the optical lens assembly for image photographing to the focal length $f_1$ of the first lens element, $pow_2$ is the ratio of the focal length f of the optical lens assembly for image photographing to the local length $f_2$ of the second lens element, $pow_3$ is the ratio of the focal length f of the optical lens assembly for image photographing to the focal length $f_3$ of the third lens element, $pow_4$ is the ratio of the focal length f of the optical lens assembly for image photographing to the focal length $f_4$ of the fourth lens element, and the following condition is preferably satisfied:

$$(pow1+pow2)/(pow3-pow4)<0.4.$$

6. The optical lens assembly for image photographing of claim 3, wherein TTL is the axial distance from the object-side surface of the first lens element to the image plane, ImgH is a half of the diagonal length of the effective photosensitive area of the image sensor, and the following condition is satisfied:

$$TTL/ImgH<2.1.$$

7. The optical lens assembly for image photographing of claim 3, wherein $v_3$ is an Abbe number of the third lens element, $v_4$ is an Abbe number of the fourth lens element, and the following condition is satisfied:

$$25<v_3-v_4<40.$$

8. The optical lens assembly for image photographing of claim 7, wherein $R_7$ is a radius of curvature of the object-side surface of the fourth lens element, $R_8$ is a radius of curvature of the image-side surface of the fourth lens element, and the following condition is satisfied:

$|R_8/R_2|<0.6.$

9. The optical lens assembly for image photographing of claim 7, wherein f is the focal length of the optical lens assembly for image photographing, $f_1$ is the focal length of the first lens element, and the following condition is preferably satisfied:

$0.0<f/f_1<0.55.$

10. The optical lens assembly for image photographing of claim 3, wherein HFOV is a half of maximum view angle of the image photographing system (by a unit of degree), and the following condition is satisfied:

$HFOV>36°.$

11. The optical lens assembly for image photographing of claim 1, wherein $CT_1$ is a central thickness of the first lens element, $CT_4$ is a central thickness of the fourth lens element, and the following condition is satisfied:

$0.3<CT_1/CT_4<1.5.$

12. The optical lens assembly for image photographing of claim 11, wherein f is a focal length of the optical lens assembly for image photographing, $f_2$ is a focal length of the second lens element, and the following condition is satisfied:

$0<f/f_2<0.4.$

13. The optical lens assembly for image photographing of claim 1, wherein the second lens element has a convex object-side surface, and both object-side and image-side surfaces of the second lens element are aspheric.

14. An optical lens assembly for image photographing, in order from an object side to an image side comprising:
a first lens element with positive refractive power;
a second lens element with positive refractive power;
a third lens element with positive refractive power, having a convex image-side surface;
a fourth lens element with negative refractive power, made of plastic, having a concave image-side surface, and both object-side surface and image-side surface being aspheric;
wherein TTL is an axial distance from the object-side surface of the first lens element to an image plane, ImgH is a half of the diagonal length of the effective photosensitive area of the image sensor, $R_7$ is a radius of curvature of the object-side surface of the fourth lens element, $R_8$ is a radius of curvature of the image-side surface of the fourth lens element, and the following conditions are satisfied:

$TTL/ImgH<2.1;$ and $|R_8/R_7|<0.8.$

15. The optical lens assembly for image photographing of claim 14, wherein at least one of the object-side surface and the image-side surface of the fourth lens element has at least one inflection point.

16. The optical lens assembly for image photographing of claim 15, wherein f is a focal length of the optical lens assembly for image photographing, $f_2$ is a focal length of the second lens element, and the following condition is satisfied:

$0<f/f_2<0.8.$

17. The optical lens assembly for image photographing of claim 16, wherein $v_3$ is an Abbe number of the third lens element, $v_4$ is an Abbe number of the fourth lens element, and the following condition is satisfied:

$25<v_3-v_4<40.$

18. The optical lens assembly for image photographing of claim 16, wherein $R_7$ is a radius of curvature of the object-side surface of the fourth lens element, $R_8$ is a radius of curvature of the image-side surface of the fourth lens element, and the following condition is satisfied:

$|R_8/R_7|<0.6.$

19. The optical lens assembly for image photographing of claim 18, wherein $pow_1$ is a ratio of the focal length f of the optical lens assembly for image photographing to the focal length $f_1$ of the first lens element, $pow_2$ is a ratio of the focal length f of the optical lens assembly for image photographing to the local length $f_2$ of the second lens element, $pow_3$ is a ratio of the focal length f of the optical lens assembly for image photographing to the focal length $f_3$ of the third lens element, $pow_4$ is a ratio of the focal length f of the optical lens assembly for image photographing to the focal length $f_4$ of the fourth lens element, and the following condition is satisfied:

$(pow_1+pow_2)/(pow_3-pow_4)<0.7.$

20. The optical lens assembly for image photographing of claim 15, further comprising a stop, wherein SL is an axial distance from the stop to the image plane, TTL is an axial distance from the object-side surface of the first lens element to the image plane, and the following condition is satisfied:

$0.75<SL/TTL<1.1.$

21. The optical lens assembly for image photographing of claim 20, wherein f is the focal length of the optical lens assembly for image photographing, $f_1$ is the focal length of the first lens element, and the following condition is satisfied:

$0.0<f/f_1<0.55.$

* * * * *

UNITED STATES PATENT AND TRADEMARK OFFICE
CERTIFICATE OF CORRECTION

PATENT NO. : 8,411,377 B2
APPLICATION NO. : 13/237600
DATED : April 2, 2013
INVENTOR(S) : Tsung-Han Tsai and Hsin-Hsuan Huang It is certified that error appears in the above-identified patent and that said Letters Patent is hereby corrected as shown below:

In the Claims:

Column 27, Claim 8, line 6, "$|R_8/R_2| < 0.6$" should be "$|R_8/R_7| < 0.6$"

Signed and Sealed this
Second Day of July, 2013

Teresa Stanek Rea
*Acting Director of the United States Patent and Trademark Office*